United States Patent
Jun et al.

(10) Patent No.: US 8,743,338 B2
(45) Date of Patent: Jun. 3, 2014

(54) LIQUID CRYSTAL DISPLAY DEVICE

(75) Inventors: Joung Beum Jun, Seoul (KR); Jong Hyeok Kim, Gumi (JP)

(73) Assignee: LG Display Co., Ltd., Seoul (KR)

( * ) Notice: Subject to any disclaimer, the term of this patent is extended or adjusted under 35 U.S.C. 154(b) by 590 days.

(21) Appl. No.: 12/954,081

(22) Filed: Nov. 24, 2010

(65) Prior Publication Data
US 2011/0187983 A1 Aug. 4, 2011

(30) Foreign Application Priority Data

Feb. 4, 2010 (KR) .......................... 10-2010-0010592
Nov. 9, 2010 (KR) .......................... 10-2010-0110730

(51) Int. Cl.
*G02F 1/1333* (2006.01)
*G02F 1/1335* (2006.01)

(52) U.S. Cl.
USPC .............................. 349/161; 349/58; 349/65

(58) Field of Classification Search
USPC .......................... 349/61–65, 58, 161; 362/612
See application file for complete search history.

(56) References Cited

U.S. PATENT DOCUMENTS

| 7,275,851 | B2 | 10/2007 | Sakurai | |
| 7,978,286 | B2 * | 7/2011 | Kono et al. | 349/64 |
| 8,021,032 | B2 * | 9/2011 | Pei | 362/612 |
| 8,279,372 | B2 * | 10/2012 | Shimura et al. | 349/65 |
| 2008/0111944 | A1 * | 5/2008 | Sakai | 349/61 |
| 2008/0117361 | A1 * | 5/2008 | Chun et al. | 349/65 |
| 2011/0025942 | A1 * | 2/2011 | Lee | 349/58 |

FOREIGN PATENT DOCUMENTS

| JP | 2004-006193 A | 1/2004 |
| KR | 10-2006-0109107 A | 10/2006 |

* cited by examiner

*Primary Examiner* — Edward Glick
*Assistant Examiner* — David Chung
(74) *Attorney, Agent, or Firm* — Birch, Stewart, Kolasch & Birch, LLP

(57) ABSTRACT

A liquid crystal display device is discussed. A liquid crystal display device includes according to an embodiment a liquid crystal panel having a liquid crystal layer formed between a first substrate and a second substrate, a backlight unit comprising a light source part located adjacent to a short side of the liquid crystal panel and a light guide plate configured to transmit a light emitted from the light source part to the liquid crystal panel, a supporting member configured to support the backlight unit, and a first heat radiating member radiating heat generated from the light source part, wherein the first heat radiating member is provided at one side of the supporting member, and is positioned between the light source part and the supporting member. According to the present invention, material cost for the light source part is reduced and production cost may be lowered accordingly.

9 Claims, 17 Drawing Sheets

LIQUID CRYSTAL DISPLAY DEVICE

CROSS REFERENCE TO RELATED APPLICATION

This application claims the priority benefit of the patent Korean Application Nos. 10-2010-0010592 filed on Feb. 4, 2010 and 10-2010-0110730 filed on Nov. 9, 2010, all of which are hereby incorporated by reference as if fully set forth herein.

BACKGROUND OF THE DISCLOSURE

1. Field of the Disclosure

The present invention relates to a liquid crystal display device which displays an image, using transmittance variation.

2. Discussion of the Related Art

Liquid crystal display devices have been applied to notebook computers, monitors, spacecrafts, aircrafts and the like, because they require a low operation voltage and low power consumption accordingly, with easy portability. Such a liquid crystal display device includes a liquid crystal panel and a back-light unit configured to supply a light to the liquid crystal panel.

The liquid crystal panel includes a first substrate having a color filter array formed thereon, a second substrate having a thin film transistor (TFT) formed thereon and a liquid crystal located between the first and second substrates.

The back-light unit includes a light source to supply the light to the liquid crystal panel. A plurality of light sources may be aligned on the back-light unit below the liquid crystal panel, corresponding to a entire surface of the liquid crystal panel, such that the lights emitted from the light sources may be supplied to the liquid crystal panel directly.

Since the back-light unit includes the predetermined number of the light sources corresponding to the entire surface of the liquid crystal panel, a conventional liquid crystal panel according to the related art has to include quite an amount of light sources and the conventional liquid crystal panel has a disadvantage of a high production cost accordingly.

SUMMARY OF THE DISCLOSURE

Accordingly, the present invention is directed to a liquid crystal display device.

An object of the present invention is to provide a liquid crystal display device capable to reducing the number of light sources to lower the production cost.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, A liquid crystal display device includes a liquid crystal panel having a liquid crystal layer formed between a first substrate and a second substrate; a backlight unit comprising a light source part located adjacent to a short side of the liquid crystal panel and a light guide plate configured to transmit a light emitted from the light source part to the liquid crystal panel; a supporting member configured to support the backlight unit; and a first heat radiating member radiating heat generated from the light source part, wherein the first heat radiating member is provided at one side of the supporting member, and is positioned between the light source part and the supporting member.

According to the present invention, material cost for the light source part is reduced and production cost may be lowered accordingly. In addition, quality of an image may be prevented from deteriorating, which heat generated from the light source part might occur.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

As follows, a liquid crystal display device according to an exemplary embodiment of the present invention will be described in reference to the accompanying drawings.

Figure 1:
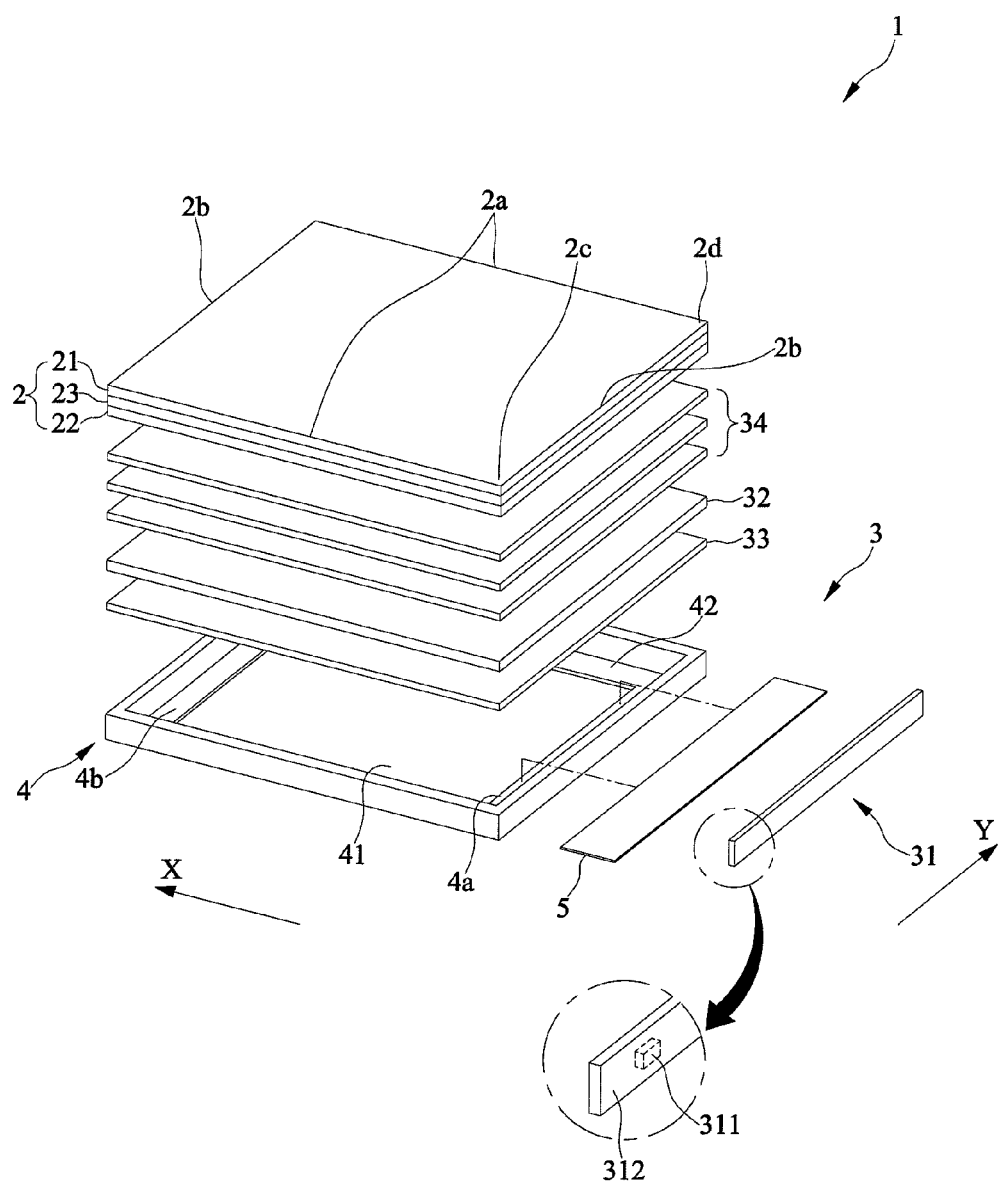
FIG. 1 is an exploded perspective view schematically illustrating a liquid crystal display device according to an exemplary embodiment of the present invention.
Figure 2:
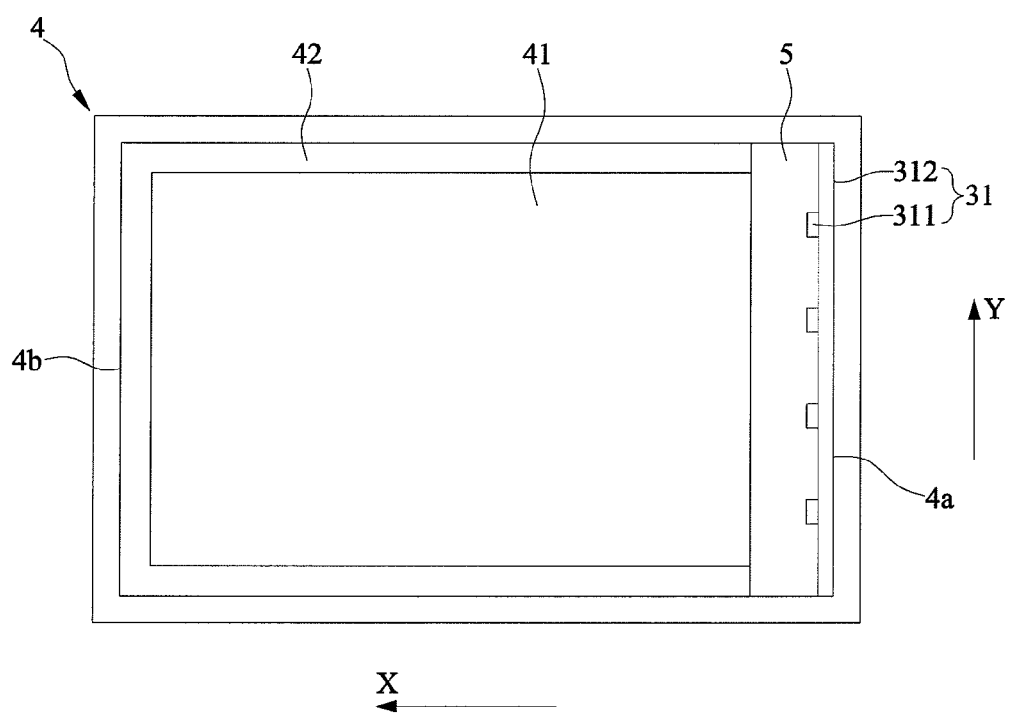
FIG. 2 is a plane view schematically illustrating a first heat-radiating member according to a first embodiment of the present invention.

FIG. 1 is an exploded perspective view schematically illustrating a liquid crystal display device according to an exemplary embodiment of the present invention. FIG. 2 is a plane view schematically illustrating a first heat-radiating member according to a first embodiment of the present invention.

In reference to FIG. 1, a liquid crystal display device 1 according to the embodiment of the present invention includes a liquid crystal panel 2, a backlight unit 3, a supporting member 4 and a first heat radiating member 5.

The liquid crystal panel 2 may display images, using transmittance variation of liquid crystal. The liquid crystal panel 2 includes a first substrate 21 having a color filter array formed thereon, a second substrate 22 having a thin film transistor array formed thereon and a liquid crystal layer 23 formed between the first and second substrates. A variety of liquid panels well-known to the art to which the present invention pertains may be applicable to the liquid crystal display device 1 according to this embodiment, for example, TN (Twisted Nematic) mode, VA (Vertical Alignment) mode, IPS (In Plane Switching) mode and FFS (Fringe Field Switching) mode and the like.

The liquid crystal panel 2 includes a long side 2a and a short side 2b. In other words, the liquid crystal panel 2 may have a rectangular shape, with the long side 2a longer than the short side 2b. The liquid crystal panel 2 may include two long sides 2a and two short sides 2b.

The backlight unit 3 is configured to supply lights to the liquid crystal panel 2. With respect to FIG. 1, the backlight unit 3 may be mounted to the supporting member 4 to be located below the liquid crystal panel 2. The backlight unit 3 may include a light source part 31 and a light guide plate 32.

The light source part 31 emits lights which will be supplied to the liquid crystal panel 2. Such a light emitted from the light source part 31 is incident on the light guide plate 32 and the light is supplied to the liquid crystal panel 2 by the light guide plate 32. The light source part 31 may include a plurality of light sources 311 configured to emit lights and a substrate 312 having the light sources aligned with each other, spaced apart a predetermined distance, thereon. The substrate 312 may have a function of supporting the light sources 311, with being connected with the light sources 311 to allow them to receive voltages. The substrate 312 may be a printed circuit board (PCB), a flexible printed circuit board (FPCB) and the like.

The light source part 31 may be located adjacent to the short side 2b of the liquid crystal panel 2. Because of that, the liquid crystal display device 1 according to the present invention may have following operational effects.

First, the liquid crystal display device according to the related art includes a backlight unit having a plurality of light sources aligned thereon to correspond to a entire surface of a liquid crystal panel. Because of that, a predetermined number of the light sources corresponding to an entire section of the liquid crystal panel and a predetermined size of the substrate corresponding to the entire section of the liquid crystal panel have to be required. In contrast, the light source part 31 of the liquid crystal display device 1 according to the present invention is located adjacent to the short side 2b of the liquid crystal panel 2. Because of that, the light source part 31 may have include a predetermined number of light sources 311 corresponding to the length of the short side 2b and size of the substrate 312 may be corresponding to the length of the short side 2b of the liquid crystal panel 2. As a result, the liquid crystal display device 1 according to the present invention may reduce the size of the light source part 31 and the number of the light sources 31 in comparison to the conventional liquid crystal display device according to the related art, and the material cost may be reduced only to lowers the production cost.

Second, the light source part 31 of the liquid crystal display device 1 according to the present invention is located adjacent to the short side 2b of the liquid crystal panel 2. Because of that, compared with a case in that the light source is located on the long side 2a of the liquid crystal panel 2, the size of the light source part 31 and the number of the light sources 311 may be reduced. As a result, the material cost may be reduced to lower the production cost.

The light source part 31 may be located adjacent to one of short sides 2b of the liquid crystal panel 2 and light emitting diode (LED) may be used as light source 311.

The light guide plate 32 transmits the light emitted from the light source part 31 to the liquid crystal panel 2. Here, the light guide plate 32 may change a path of the light to guide the light emitted from the light source part 31 toward the liquid crystal panel 2. For that, the light guide plate 32 may have a variety of patterns to change the path of the light. With respect to FIG. 1, the light guide plate 32 may be located below the liquid crystal panel 2. The light source part 31 may be located beside the light guide plate 32 to make the light emitted from the light source part 31 be incident on the light guide plate 32.

In reference to FIG. 1, the backlight unit 3 may include a reflective plate 33 and an optical sheet 34.

The reflective plate 33 may be located underneath the light guide plate 32 with respect to FIG. 1. The reflective plate 33 reflects the light moved below the light guide plate 32 toward the light guide plate 32 and it may prevent the light emitted from the light source part 31 from being lost below the light guide plate 32.

The optical sheet 34 may be located between the liquid crystal panel 2 and the light guide plate 32. The optical sheet 34 enables the light incident on the light guide plate to be supplied to the liquid crystal panel 2 uniformly. The optical sheet 34 may be configured of combination of a diffusion sheet and prism sheet.

In reference to FIG. 1, the supporting member 4 supports the backlight unit 3. The supporting member 4 may include an accommodating recess 41 configured to accommodate the backlight unit 3 and a supporting plate 42 configured to support the backlight unit 3. The backlight unit 3 and the liquid crystal panel 2 may be accommodated in the accommodating recess 41 and the supporting member 4 may support the backlight unit 3 and the liquid crystal panel 2. Here, the supporting member 4 may be formed in a rectangular shape and it may include four supporting plates 42.

In reference to FIGS. 1 and 2, the first heat radiating member 5 may radiate heat generated from the light source part 31. The first heat radiating member 5 may be provided at one side of the supporting member 4 to be located between the light source part 31 and the supporting member 4. The light source part 31 may be provided at one side of the supporting member 4 to be located adjacent to the short side 2b of the liquid crystal panel 2. With respect to FIG. 1, the first heat radiating member 5 may be secured to one side 4a of the supporting member to be located underneath the light source part 31. The first heat radiating member 4 may be secured to one side 4a of the supporting member 4 to be located underneath the reflective plate 33. The first heat radiating member 5 may be mounted on one of the supporting plates 42 which is located in one side 4a of the supporting member 4. The heat generated from the light source part 31 may be transmitted along a direction from one side 4a of the supporting member 4 toward the opposite side 4b of the supporting member 4 (X-arrow direction, hereinafter, 'first direction) by the first heat radiating member 5. The first direction (X-arrow direction) may be a direction getting apart from the light source part 31. Here, the first heat radiating member 5 may be formed of Aluminum (Al) having good heat conductivity.

The first heat radiating member 5 may give the liquid crystal display device 1 following effects.

Figure 3:
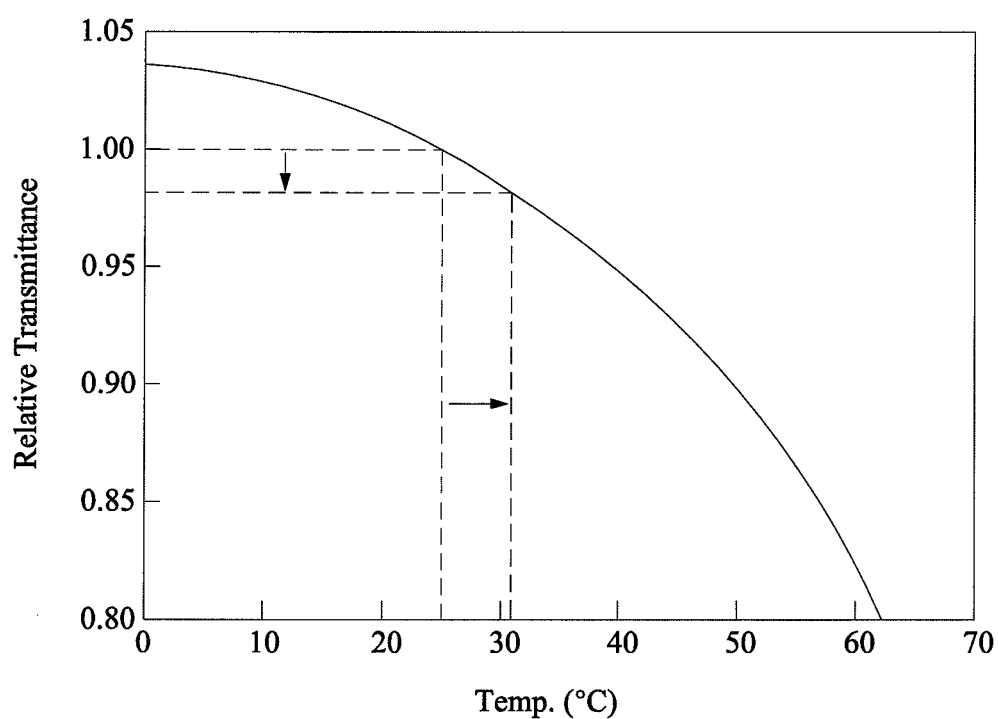
FIG. 3 is a diagram illustrating relation between the temperature and transmittance of liquid crystal.

First, the heat is generated in the light source part 31 during emitting the lights. Especially, when using LED as the light sources 311, quite a heat may be generated from the LEDs and the heat generated from the LEDs would deteriorate the transmittance of the liquid crystal panel 2. As shown in FIG. 3, the transmittance of liquid crystal is lowered as the temperature of liquid crystal is heightened. A horizontal axis of FIG. 3 indicates the temperature and a vertical axis of FIG. 3 indicates the transmittance of liquid crystal. The light source part 31 of the liquid crystal display device 1 according to the present invention is mounted to the short side 2b of the liquid crystal panel 2. Because of that, temperature difference may be generated between a portion close to the short side 2b having the light source part 3 mounted thereto and a portion distant from the short side 2b. As a result, transmittance difference may be partially generated in the liquid crystal panel 2 by the heat generated from the light source part 31 and an image displayed close to the short side 2b having the light source part 31 mounted thereto may be relatively dark. To solve this disadvantage, the liquid crystal display device 1 according to the present invention may include the first heat radiating member 5 and the first heat radiating member 5 radiates the heat generated from the light source part 31.

Because of that, the temperature difference between the portion close to the light source part 31 and the portion distant from the light source part 31 may be reduced.

Second, the liquid crystal display device 1 according to the present invention may enable temperature variation to be generated gently from the portion close to the light source part 31 to the portion distant from the light source part 31. As a result, the transmittance variation generated by the heat of the light source part 31 may be gentle in the light crystal display device 1 according to the present invention. Even though it is partially generated in the liquid crystal panel 2, the transmittance difference may be eased.

Third, the heat generated from the light source part 31 happens to damage to the light guide plate 32 and the supporting member 4. However, the liquid crystal display device 1 according to the present invention includes the first heat radiating member 5 capable of radiating the heat generated from the light source part 31 and the light guide plate 32 and the supporting member 4 may be prevented from damaging.

The liquid crystal display device 1 according to the present invention may include a variety of embodiments of the first heat radiating member 5. As follows, each of the embodiments will be described in the related drawings.

First Embodiment

In reference to FIGS. 1 and 2, the first heat radiating member 5 may be formed in a rectangular shape expended along a longitudinal direction of the short side 2b composing the liquid crystal panel 2 (Y-arrow direction). The first heat radiating member 5 may be formed, with a predetermined length approximately corresponding to the length of the short side 2b composing the liquid crystal panel 2 (the length along Y-arrow direction). The first heat radiating member 5 may be formed, with a predetermined width along the first direction (X-arrow direction). The heat generated from the light source part 31 may be transmitted along the width direction of the first heat radiating member 5 (X-arrow direction). Because of that, the liquid crystal display device 1 according to the present invention allows the first heat radiating member 5 to radiate the heat generated from the light source part 31, only to reduce the temperature difference between the portion of the liquid crystal panel 2 close to the light source part 31 and the portion distant from the light source part 31. Here, the first heat radiating member 5 may have an overall square shape.

Second Embodiment

Figure 4:
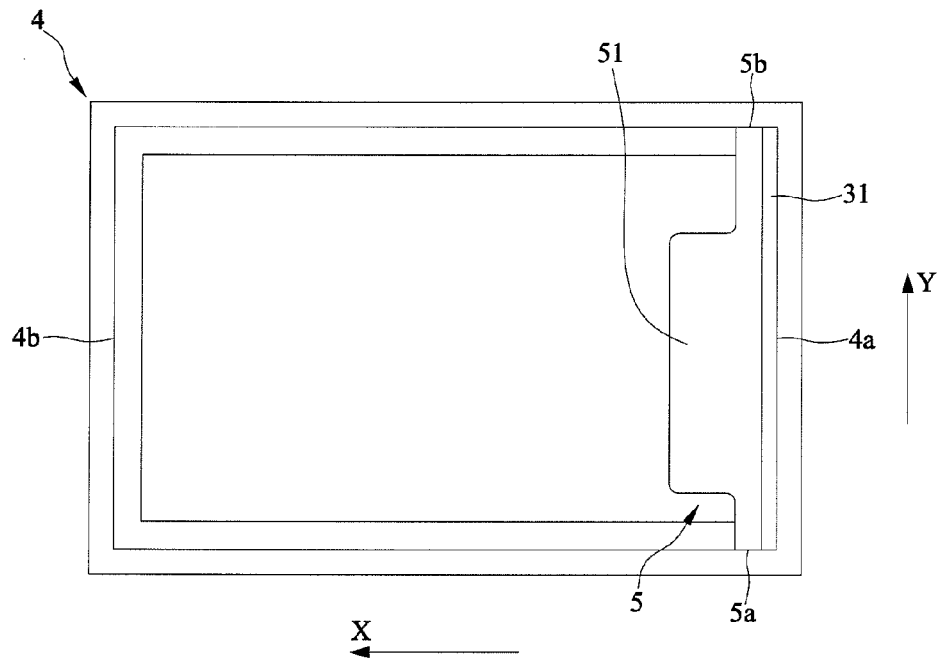
FIG. 4 is a plane view schematically illustrating a first heat radiating member according to a second embodiment of the present invention.

FIG. 4 is a plane view schematically illustrating a first heat radiating member according to a second embodiment of the present invention.

In reference to FIGS. 1 and 4, a first heat radiating member 5 according to the second embodiment may include a projected member 51. The projected member 51 may be projected toward the first direction (X-arrow direction). In other words, the projected member 51 may be projected along the longitudinal direction of the long side 2a of the liquid crystal panel 2 (X-arrow direction). The projected member 51 may give the liquid crystal display device following effects.

First, the first heat radiating member 5 may increase the distance of the heat transmission from the light source part 31 along the first direction (X-arrow direction). Because of that, the heat generated from the light source part 31 may be transmitted farther from the light source part 31. Accordingly, the liquid crystal display device 1 according to the present invention may reduce the temperature difference between the portion of the liquid crystal panel 2 close to the light source part 31 and the portion distant from the light source part 31 relatively more.

Second, the liquid crystal display device 1 according to the present invention may ease the temperature variation from the portion of the liquid crystal panel 2 close to the light source part 31 to the portion distant from the light source part 31. Because of that, the liquid crystal display device 1 according to the present invention may enable the transmittance variation generated by the heat of the light source part 31 to be gentler. As a result, even if the transmittance difference is generated in the liquid crystal panel 2 partially, the liquid crystal display device 1 according to the present invention may ease the difference.

The projected member 51 may be formed in a rectangular shape expanded longitudinally along a longitudinal direction of the short side 2b composing the liquid crystal panel 2 (Y-arrow direction). Here, the projected member 51 may have a shorter length than the short side 2b of the liquid crystal panel 2.

The projected member 51 may be formed between one end 5a and the other end 5b of the first heat radiating member 5. The one end 5a and the other end 5b of the first heat radiating member 5 are corresponding to corners 2c and 2d (see, FIG. 1) of the liquid crystal panel 2. The corners 2c and 2d of the liquid crystal panel 2 have more noticeable brightness difference, if the transmittance difference is generated by the temperature difference with the other portions of the liquid crystal panel 2. To prevent that, the projected member 51 may be projectedly formed between one end 5a and the other end 5b of the first heat radiating member 5. As a result, the heat generated from the light source part 31 may be transmitted to the projected member 51 formed between one end 5a and the other end 5b of the first heat radiating member 5. because of that, the first heat radiating member 5 according to the second embodiment of the present invention may prevent brightness difference at the corners 2c and 2d of the liquid crystal panel 2 from recognized clearly.

Compared with the first heat radiating member 5 according to above first embodiment, the first heat radiating member 5 according to the second embodiment has the relatively small sizes at one end 5a and the other end 5b respectively, and has the relatively large sizes between one end 5a and the other end 5b because of the projected member 51. As a result, the first heat radiating member 5 according to the second embodiment may induce the heat generated from the light source part 31 to be transmitted to the projected member 51. Accordingly, the first heat radiating member 5 according to the second embodiment may reinforce the function of preventing the bright difference from recognized clearly at the corners 2c and 2d of the liquid crystal panel 2. in addition, the first heat radiating member 5 according to the second embodiment may reduce the temperature difference between the portions of the liquid crystal panel 2 close to the light source part 31 and distant from the light source part 31 and the temperature variation from the portion close to the light source part 31 to the portion distant from the light source part 31 may be generated more gently as a result.

The first heat radiating member 5 according to the second embodiment of the present invention may be formed, with a predetermined size and weight approximately corresponding to the size of the first heat radiating member 5 according to the first embodiment. In other words, the size and weight of both ends 5a and 5b may be reduced as much as the increased size and weight of the projected member 51. Because of that, the size and weight of the first heat radiating member 5 according to the second embodiment may be approximately corresponding to those of the first heat radiating member 5 according to the first embodiment. As a result, compared with the first embodiment, the first heat radiating member 5 according to the second embodiment may achieve a more excellent operational effect, even with maintaining the material cost and the like.

Third Embodiment

Figure 5:
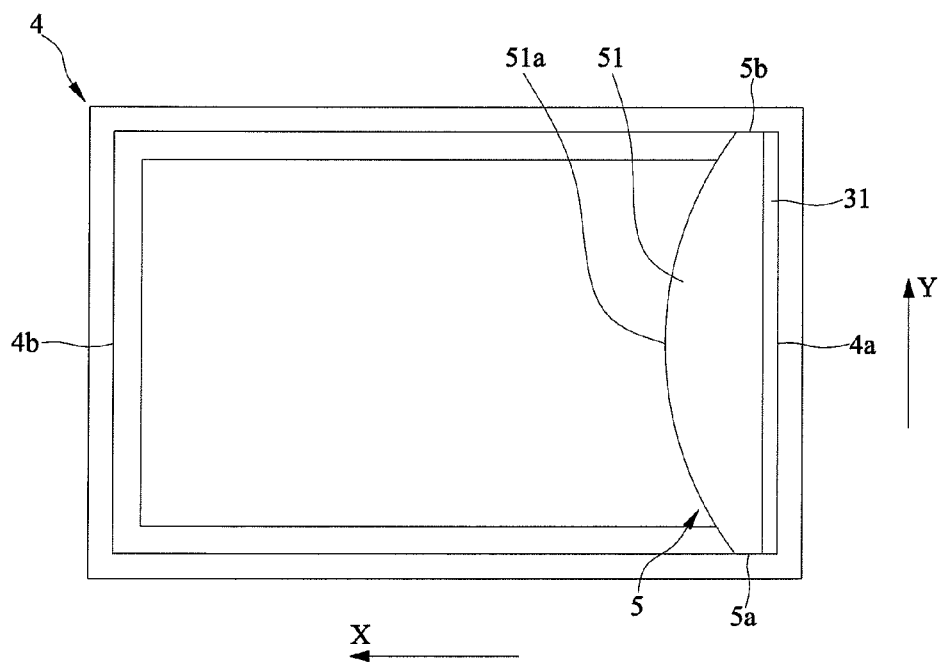
FIG. 5 is a plane view schematically illustrating a first heat radiating member according to a third embodiment of the present invention.

FIG. 5 is a plane view schematically illustrating a first heat radiating member according to a third embodiment of the present invention.

In reference to FIGS. 1 and 5, the first heat radiating member 5 according to the third embodiment may include a projected member 51. The projected member 51 may be projected toward the first direction (X-arrow direction). In other words, the projected member 51 may be projected along the longitudinal direction of the long side 2a composing the liquid crystal panel 2 (X-arrow direction).

The projected member 51 may have a first surface 51a toward the opposite side 4b of the supporting member 4, which is formed with a curvature. Because of that, compared with the second embodiment described above, the first heat radiating member 5 according to the third embodiment may enable the temperature variation to be gentler at the projected member 51.

The size of the first heat radiating member 5 may be increasing gradually toward the projected member 51 from one end 5a. The size of the first heat radiating member 5 may be increasing gradually toward the projected member 51 from the other end 5b. That is, the first heat radiating member 5 may be smallest-sized at one end 5a and the other end 5b, and it may be largest-sized at the projected member 51. The first surface 51a of the first heat radiating member 5 toward the opposite side 4b of the supporting member 4 may be formed with a single curvature. Because of that, compared with the second embodiment described above, the first heat radiating member 5 according to the third embodiment may enable the temperature variation from both ends 5a and 5b to the projected member 51 to be generated more gently. Also, the first heat radiating member 5 may have an overall shape of a sector, with the first surface 51a toward the opposite side 4b of the supporting member 4 forming a single curvature.

The first heat radiating member 5 according to the third embodiment of the present invention may be formed, with a predetermined size and weight approximately corresponding to the size of the first heat radiating member 5 according to the first embodiment. In other words, the size and weight of both ends 5a and 5b may be reduced as much as the increased size and weight of the projected member 51. Because of that, the size and weight of the first heat radiating member 5 according to the third embodiment may be approximately corresponding to those of the first heat radiating member 5 according to the first embodiment. As a result, compared with the first embodiment, the first heat radiating member 5 according to the third embodiment may achieve a more excellent operational effect, even with maintaining the material cost and the like.

Fourth Embodiment

Figure 6:
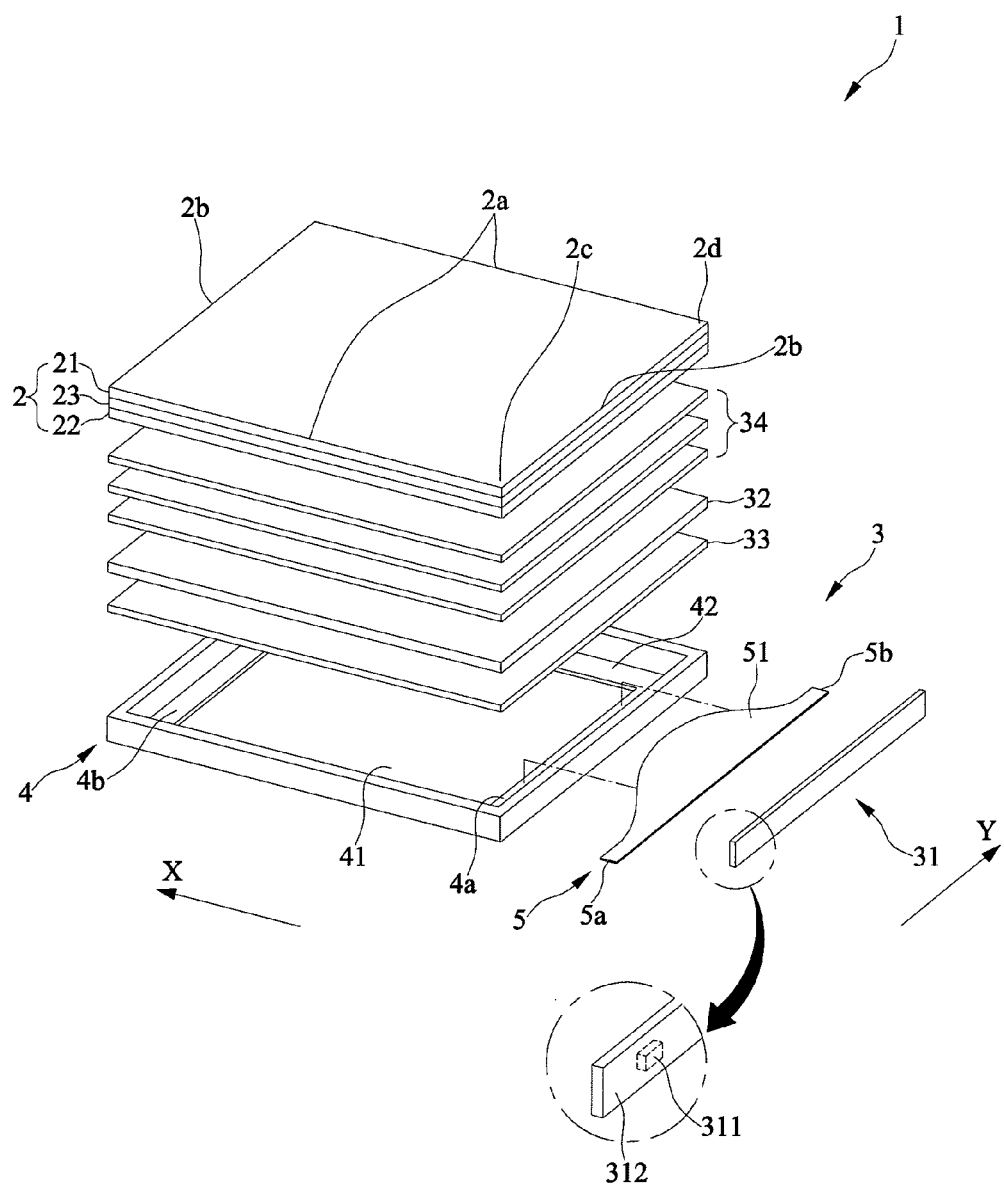
FIG. 6 is an exploded perspective view schematically illustrating a liquid crystal display device including a first heat-radiating member according to a fourth embodiment of the present invention.
Figure 7:
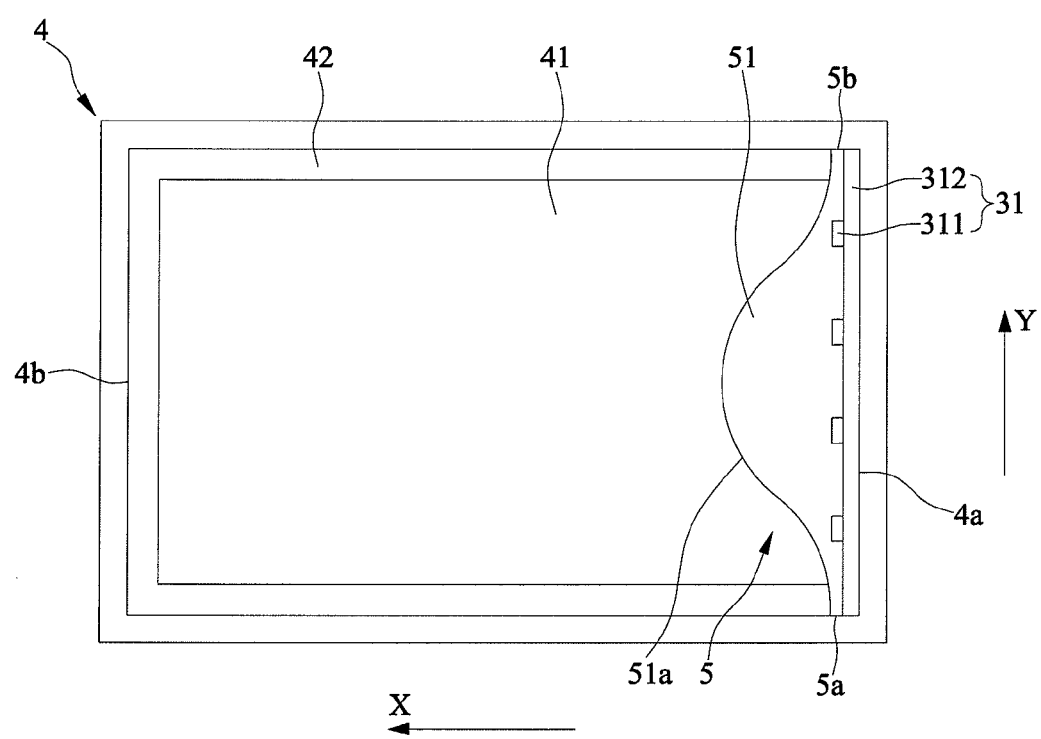
FIGS. 7 and 8 are plane vies schematically illustrating the first heat-radiating member according to the fourth embodiment of the present invention.
Figure 8:
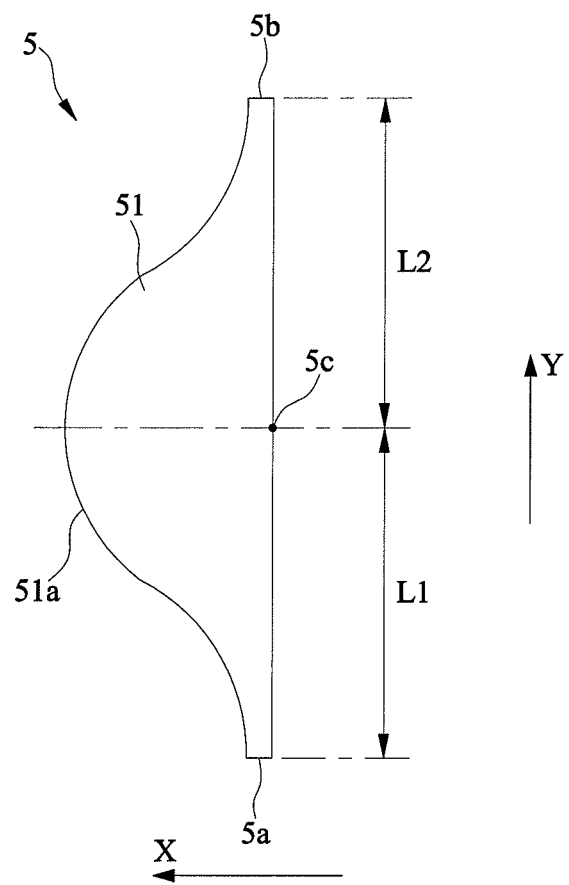

FIG. 6 is an exploded perspective view schematically illustrating a liquid crystal display device including a first heat-radiating member according to a fourth embodiment of the present invention. FIGS. 7 and 8 are plane vies schematically illustrating the first heat-radiating member according to the fourth embodiment of the present invention.

In reference to FIGS. 6 to 8, the first heat radiating member 5 according to the fourth embodiment of the present invention may include a projected member 51. The projected member 51 may be projected toward the first direction (X-arrow direction). In other words, the projected member 51 is projected in a longitudinal direction of the long side 2a composing the liquid crystal panel 2 (X-arrow direction).

The first heat radiating member 5 may be formed in a kind of Gaussian distribution shape, with a predetermined portion located between one end 5a and the other end 5b being projected toward the first direction (X-arrow direction), which will be described in detail as follows.

First of all, a first surface 51a of the first heat radiating member 5 toward the opposite side 4b of the supporting member 4 may be formed with a curvature having a slope of a tangent increasing gradually and decreasing gradually from one end 5a toward the projected member 51 (Y-arrow direction). The size of the first heat radiating member may be increasing gradually as coming closer to the projected member 51 from one end 5a.

Hence, the first surface 51a of the first heat radiating member 5 toward the opposite side 4b of the supporting member 4 may be formed with a curvature having the slope of the tangent increasing gradually and decreasing gradually from the other end 5b toward the projected member 51 (opposite to Y-arrow direction). The size of the first heat radiating member 5 may be increasing gradually toward the projected member 51 from the other end 5b. The first heat radiating member 5 may be smallest-sized at one end 5a and the other end 5b. The projected member 51 may include the first surface formed with a curvature toward the opposite side 4b of the supporting member 4. As a result, the first heat radiating member 5 may be formed in Gaussian distribution shape, with the middle portion between one end 5a and the other end 5b being projected toward the first direction (X-arrow direction).

As shown in FIG. 8, both portions of the first heat radiating member 5 with respect to a middle 5c of both ends 5a and 5b may be symmetrical to each other. In other words, the distance (L1) from one end 5a to the middle 5c may be identical to the distance (L2) from the other end 5b to the middle 5c, and the both portions with respect to the middle 5c may be symmetrical to each other.

As a result, compared with the third embodiment, the first heat radiating member 5 according to the fourth embodiment of the present invention reduces the size and weight of the predetermined portion close to the corners 2c and 2d (see, FIG. 5) of the liquid crystal panel 2, to prevent bright difference from recognized clearly at the corners 2c and 2d of the liquid crystal panel 2. In addition, compared with the third embodiment, the first heat radiating member 5 according to the fourth embodiment may enable the temperature variation from both ends 5a and 5b to the projected member 51 to be gentler. As a result, the first heat radiating member 5 according to the fourth embodiment may ease the partial transmittance difference to be not noticed by human eyes easily, even if the difference is generated partially.

The first heat radiating member 5 according to the fourth embodiment of the present invention may be formed, with a predetermined size and weight approximately corresponding to the size of the first heat radiating member 5 according to the first embodiment. In other words, the size and weight of both ends 5a and 5b may be reduced as much as the increased size and weight of the projected member 51. Because of that, the size and weight of the first heat radiating member 5 according to the fourth embodiment may be approximately corresponding to those of the first heat radiating member 5 according to the first embodiment. As a result, compared with the first embodiment, the first heat radiating member 5 according to the fourth embodiment may achieve a more excellent operational effect, even with maintaining the material cost and the like.

As follows, experiments comparing the liquid crystal display device 1 including the first heat radiating member 5 according to the fourth embodiment with the liquid crystal display device 1 including the first heat radiating member 5 according to the first embodiment will be described in the accompanying drawings.

Figure 9:
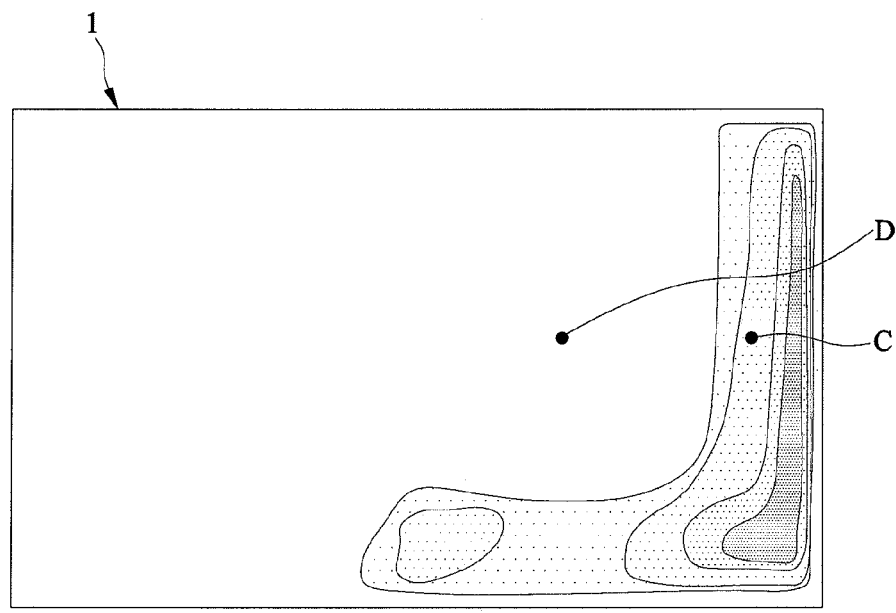
FIG. 9 is a diagram illustrating a thermal image of the liquid crystal display device including the first heat radiating member according to the first embodiment of the present invention.
Figure 10:
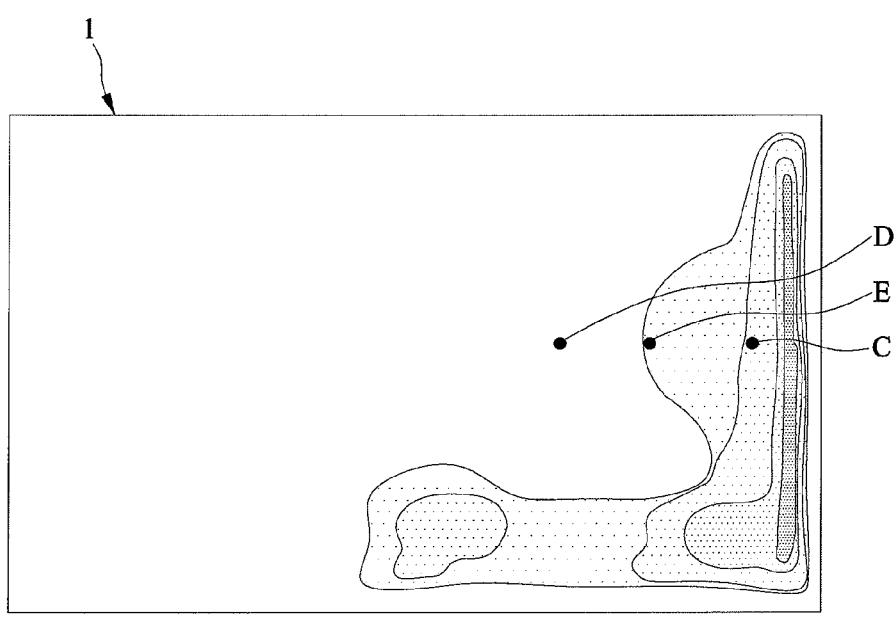
FIG. 10 is a diagram illustrating a thermal image of the liquid crystal display device including the first heat radiating member according to the fourth embodiment of the present invention.

FIG. 9 is a diagram illustrating a thermal image of the liquid crystal display device including the first heat radiating member according to the first embodiment of the present invention. FIG. 10 is a diagram illustrating a thermal image of the liquid crystal display device including the first heat radiating member according to the fourth embodiment of the present invention.

FIGS. 9 and 10 illustrate the liquid crystal display device having a TN (Twisted Nematic) mode liquid crystal panel 2 applied thereto. Here, a gray color light emitted at a point in 10 minutes after the liquid crystal display device 1 put into operation is photographed.

In reference to FIGS. 2 and 9, the liquid crystal display device 1 including the first heat radiating member 5 according to the first embodiment has a measured temperature of 31.0° C. at 'C' and a measured temperature of 26.0° C. at 'D'. According to the first embodiment, 'C' point is a location corresponding to an outermost end of the first heat radiating member 5 from one side 4a of the supporting member 4 along the first direction (X-arrow direction). 'D' point is a location spaced apart a predetermined distance from the first heat radiating member 5.

Next, in reference to FIGS. 7 and 10, the liquid crystal display device 1 including the first heat radiating member 5 according to the fourth embodiment has measured temperatures of 31.0° C. at 'C', 27.5° C. at 'D' and 29.0° C. at 'E' between 'C' and 'D'. 'C' and 'D' points according to the first embodiment are located identical to 'C' and 'D' according to the fourth embodiment. According to the fourth embodiment, 'E' point is a location corresponding to an outermost end of the first heat radiating member 5 from one side 4a of the supporting member 4 along the first direction (X-arrow direction).

As mentioned above, the liquid crystal display device 1 including the first heat radiating member 5 according to the first embodiment has the temperature difference of 5.0° C. between 'C' and 'D'. in contrast, the liquid crystal display device 1 including the first heat radiating member 5 according to the fourth embodiment has the temperature difference of 3.5° C. between 'C' and 'D'. It is shown that the temperature difference is decreased in comparison to the first embodiment. Also, the liquid crystal display device 1 including the first heat radiating member 5 according to the fourth embodiment has the temperature difference of 2.0° C. between 'C' and 'E' and 1.5° C. between 'E' and 'D'. As a result, it is shown that the temperature variation from 'C' to 'D' is generated gently and gradually.

Compared with the first embodiment described above, the first heat radiating member 5 according to the fourth embodiment of the present invention may reduce the more temperature difference between the portion of the liquid crystal panel 2 close to the light source part 31 and the portion distant from the light source part 31. Because of that, the first heat radiating member 5 according to the fourth embodiment may reduce the temperature difference partially generated from the liquid crystal panel 2 by the heat generated from the light source part 31. Also, compared with the first embodiment described above, the first heat radiating member 5 according to the fourth embodiment may allow the temperature variation to be gradually and gently generated from the portion of the liquid crystal panel 2 close to the light source part 31 and the portion distant from the light source part 31. Because of that, the first heat radiating member 5 according to the fourth embodiment of the present invention may ease the brightness difference partially generated in the liquid crystal panel 2 from noticed visually by the human eyes.

Fifth Embodiment

Figure 11:
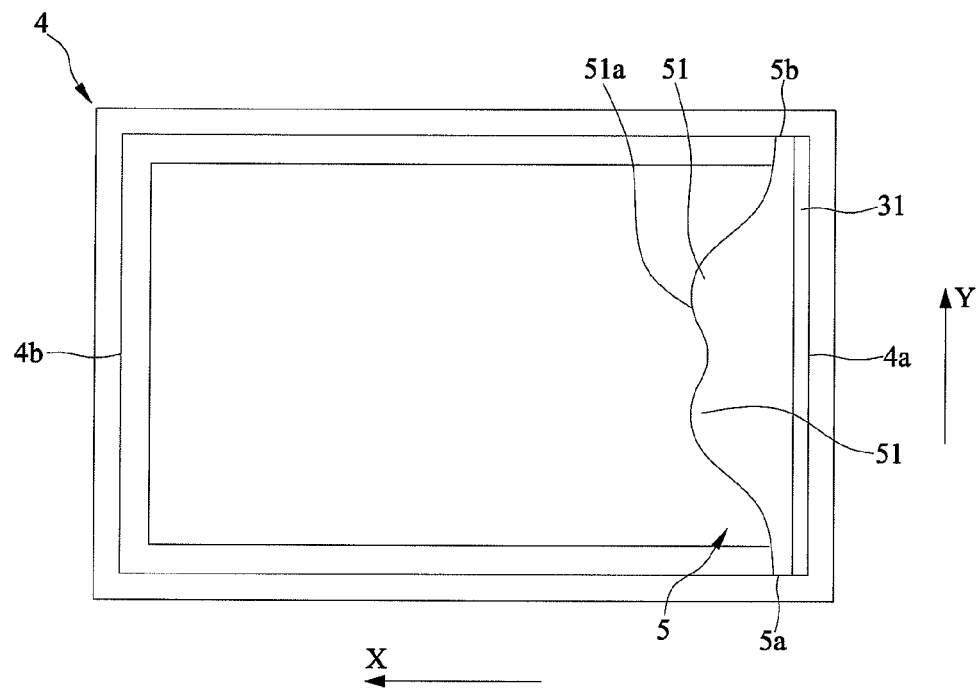
FIG. 11 is a plane view illustrating a first heat radiating member according to a fifth embodiment of the present invention.

FIG. 11 is a plane view schematically illustrating a first heat radiating member according to a fifth embodiment of the present invention.

In reference to FIGS. 6 and 11, the first heat radiating member 5 according to the fifth embodiment of the present invention may include a plurality of projected members 51. The projected members 51 may be projected toward the first direction (X-arrow direction), respectively. In other words, each of the projected members 51 may be projected along a longitudinal direction of the long side 2a composing the liquid crystal panel 2. The projected members may have first surfaces 51a formed with curvatures, respectively, toward the opposite side 4b of the supporting member 4. FIG. 11 presents two projected members provided in the first heat radiating member 5 and the first heat radiating member 5 may include three or more projected members 51. Both portions of the first heat radiating member 5 may be symmetrical to each other with respect to a middle (5c, see FIG. 8) between one end 5a and the other end 5b. The first heat radiating member 5 may be smallest-sized at one end 5a and the other end 5b and it may be largest-sized at the projected members 51.

The first heat radiating member 5 according to the fifth embodiment of the present invention may be formed, with a predetermined size and weight approximately corresponding to the size of the first heat radiating member 5 according to the first embodiment. In other words, the size and weight of both ends 5a and 5b and the size and weight of the portions between the projected members 51 may be reduced as much as the increased size and weight of the projected members 51. Because of that, the size and weight of the first heat radiating member 5 according to the fifth embodiment may be approximately corresponding to those of the first heat radiating member 5 according to the first embodiment. As a result, compared with the first embodiment, the first heat radiating member 5 according to the fifth embodiment may achieve a more excellent operational effect, even with maintaining the material cost and the like.

Sixth Embodiment

Figure 12:
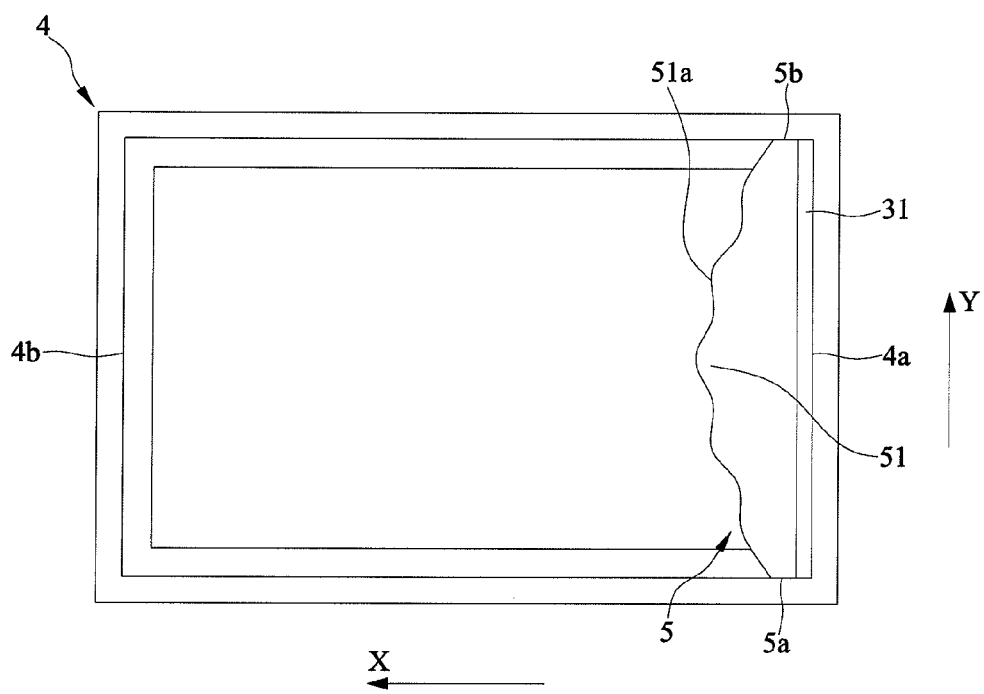
FIG. 12 is a plane view illustrating a first heat radiating member according to a sixth embodiment of the present invention.

FIG. 12 is a plane view schematically illustrating a first heat radiating member according to a sixth embodiment of the present invention.

In reference to FIGS. 6 and 12, the first heat radiating member 5 according to the sixth embodiment of the present invention includes a projected member 51. The projected member 51 may be projected toward the first direction (X-arrow direction). In other words, the projected member 51 may be projected along a longitudinal direction of the long side 2a composing the liquid crystal panel 2 (X-arrow direction).

The projected member 51 may comprise a first surface 51a formed with a winding curvature toward the opposite side 4b of the supporting member 4. That is, the first surface 51a of the projected member 51 may be windingly curved. Because of that, the first surface 51a of the first heat radiating member 5 toward the opposite side 4b of the supporting member 4 may be formed in a wave shape. Both portions of the first heat radiating member 5 may be symmetrical to each other with respect to a middle (5c, see FIG. 8) between both ends 5a and 5b. The first heat radiating member 5 may be smallest-sized at one end 5a and the other end 5b and it may be largest-sized at the middle (5c, see FIG. 8) between both ends 5a and 5b.

The first heat radiating member 5 according to the sixth embodiment of the present invention may be formed, with a predetermined size and weight approximately corresponding to the size of the first heat radiating member 5 according to the first embodiment. In other words, the size and weight of both ends 5a and 5b may be reduced as much as the increased size and weight of the projected member 51 and the projected member 51 is formed with a winding curvature. Because of that, the size and weight of the first heat radiating member 5 according to the sixth embodiment may be approximately corresponding to those of the first heat radiating member 5 according to the first embodiment. As a result, compared with the first embodiment, the first heat radiating member 5 according to the sixth embodiment may achieve a more excellent operational effect, even with maintaining the material cost and the like.

Seventh Embodiment

Figure 13:
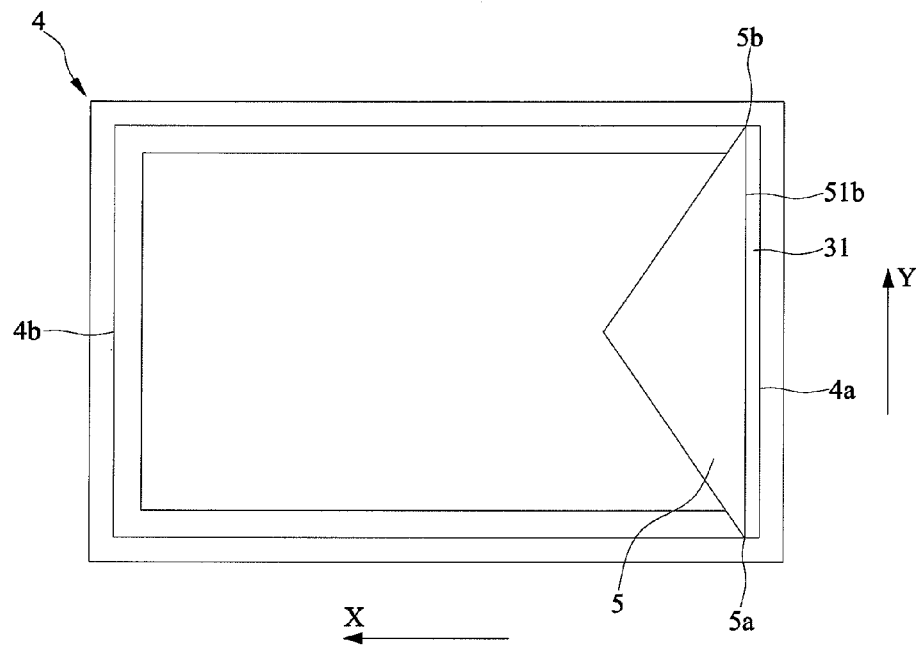
FIG. 13 is a plane view schematically illustrating a first heat radiating member according to a seventh embodiment.

FIG. 13 is a plane view schematically illustrating a first heat radiating member according to a seventh embodiment of the present invention.

In reference to FIGS. 6 and 13, the first heat radiating member 5 according to the seventh embodiment of the present invention has the size decreased gradually toward the first direction (X-arrow direction). In other words, the size of the first heat radiating member 5 may be getting decreased toward the opposite side 4b from one side 4a of the supporting member 4. The length of a second surface 51b composing the first heat radiating member 5 toward one side 4a of the supporting member 4 may be approximately identical to the length of the short side 2b of the liquid crystal panel 2 (the length of the Y-arrow direction). The size of the first heat radiating member 5 may be gradually decreased toward the first direction (X-arrow direction), to allow an end to form a cutting edge. That is, the first heat radiating member 5 may comprise a tapered end toward the opposite side 4b of the supporting member 4. For example, the first heat radiating member 5 may be formed in an overall triangle shape. Both portions of the first heat radiating member 5 may be symmetrical to each other with respect to a middle (5c, see FIG. 8) between both ends 5a and 5b. As a result, the first heat radiating member 5 may be formed in an overall isosceles triangle shape.

The first heat radiating member 5 according to the seventh embodiment of the present invention may be formed, with a predetermined size and weight approximately corresponding to the size of the first heat radiating member 5 according to the first embodiment. As a result, compared with the first embodiment, the first heat radiating member 5 according to the seventh embodiment may achieve a more excellent operational effect, even with maintaining the material cost and the like.

Eighth Embodiment

Figure 14:
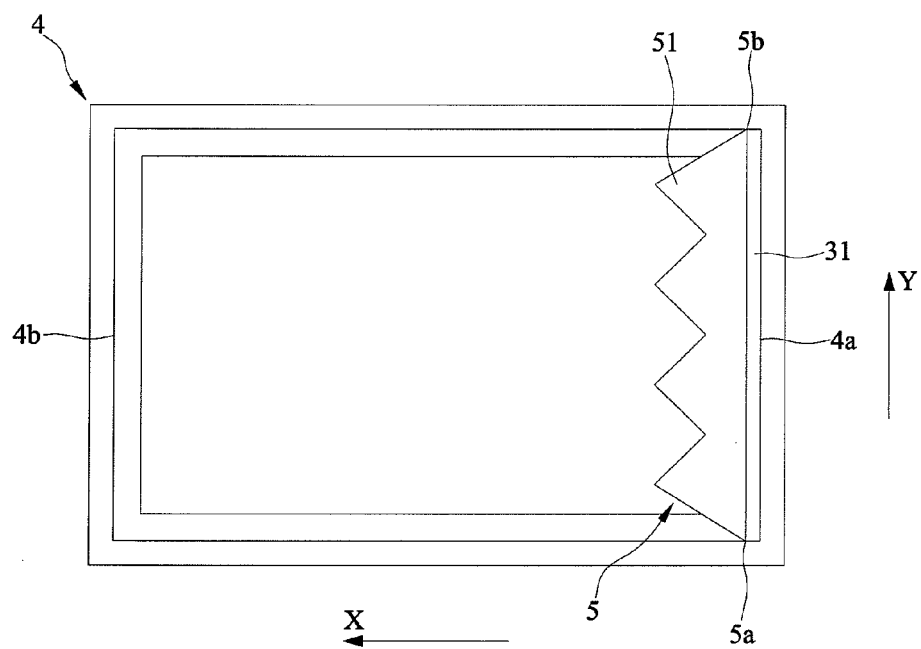
FIG. 14 is a plane view schematically illustrating a first heat radiating member according to an eighth embodiment.

FIG. 14 is a plane view schematically illustrating a first heat radiating member according to an eighth embodiment of the present invention.

In reference to FIGS. 6 and 14, the first heat radiating member 5 according to the eighth embodiment of the present invention may include a plurality of projected members 51. The projected members 51 may be projected toward the first direction (X-arrow direction). In other words, the projected members 51 may be projected along a longitudinal direction of the long side 2a composing the liquid crystal panel 2 (X-arrow direction), respectively. Each of the projected members 51 has the size decreased gradually toward the first direction (X-arrow direction), to allow an end to form a cutting edge. That is, each of the projected members 51 may comprise a tapered end toward the opposite side 4b of the supporting member 4. For example, each of the projected members 51 may be formed in an overall isosceles triangle shape.

The projected members 51 may be connected with each other along a longitudinal direction (Y-arrow direction) of the short side 2b composing the liquid crystal panel 2. FIG. 14 presents fourth projected members 51 provided in the first heat radiating member 5. The first heat radiating member 5 may include two or more and four or less projected members 51 or it may include five or more projected members 51. Both portions of the first heat radiating member 5 may be symmetrical to each other with respect to a middle (5c, see FIG. 8) between both ends 5a and 5b. The first heat radiating member 5 may be smallest-sized at one end 5a and the other end 5b.

The first heat radiating member 5 according to the eighth embodiment of the present invention may be formed, with a predetermined size and weight approximately corresponding to the size of the first heat radiating member 5 according to the first embodiment. In other words, the size and weight of both ends 5a and 5b and the size and weight of the portions between the projected members 51 may be reduced as much as the increased size and weight of the projected members 51. Because of that, the size and weight of the first heat radiating member 5 according to the eighth embodiment may be approximately corresponding to those of the first heat radiating member 5 according to the first embodiment. As a result, compared with the first embodiment, the first heat radiating member 5 according to the eighth embodiment may achieve a more excellent operational effect, even with maintaining the material cost and the like.

Ninth Embodiment

Figure 15:
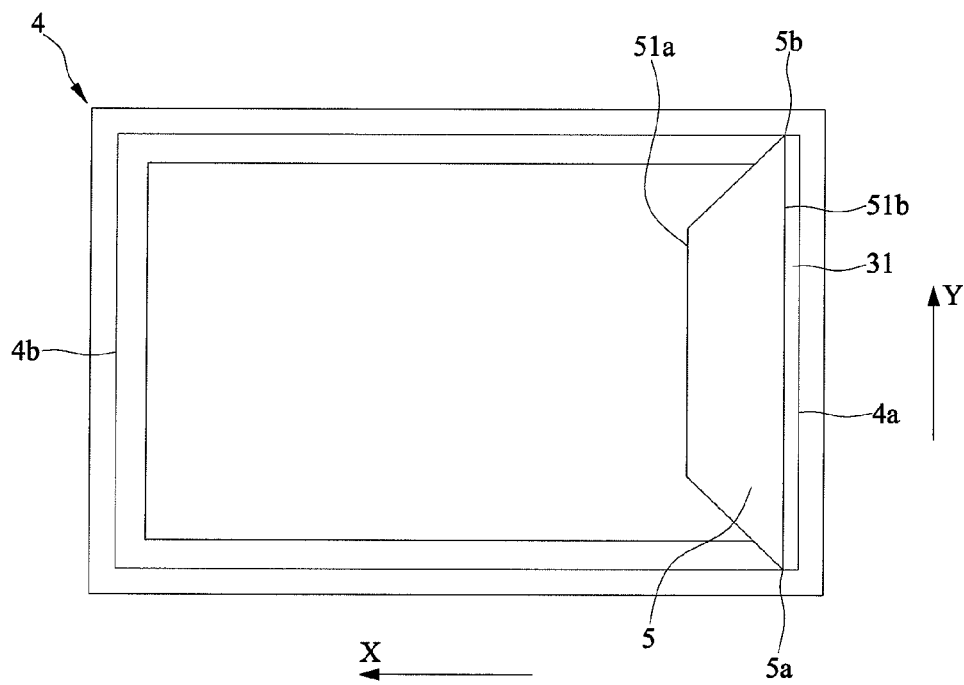
FIG. 15 is a plane view schematically illustrating a first heat radiating member according to a ninth embodiment.

FIG. 15 is a plane view schematically illustrating a first heat radiating member according to a ninth embodiment of the present invention.

In reference to FIGS. 6 and 15, the first heat radiating member 5 according to the ninth embodiment of the present invention has the predetermined size gradually decreased toward the first direction (X-arrow direction). In other words, the size of the first heat radiating member 5 may be decreased gradually from one side 4a toward the opposite side 4b of the supporting member 4. the length of the second surface 51b composing the first heat radiating member 5 toward the one side 4a of the supporting member 4 may be approximately corresponding to the length (length of Y-arrow direction) of the short side 2b composing the liquid crystal panel 2. The length of a first surface 51a composing the first heat radiating member 5 toward the opposite side 4b of the supporting member 4 may be shorter than the length of the short side 2b composing the liquid crystal panel 2 (length of Y-arrow direction). Because of that, the first heat radiating member 5 may be smallest-sized at one end 5a and the other end 5b and it may be largest-sized at the middle portion between both ends 5a and 5b. The first heat radiating member 5 may be formed in a trapezoidal shape with a predetermined size gradually decreased toward the first direction (X-arrow direction). Both portions of the first heat radiating member 5 may be symmetrical to each other with respect to a middle (5c, see FIG. 8) between both ends 5a and 5b.

The first heat radiating member 5 according to the ninth embodiment of the present invention may be formed, with a predetermined size and weight approximately corresponding to the size of the first heat radiating member 5 according to the first embodiment. As a result, compared with the first embodiment, the first heat radiating member 5 according to the ninth embodiment may achieve a more excellent operational effect, even with maintaining the material cost and the like.

Tenth Embodiment

Figure 16:
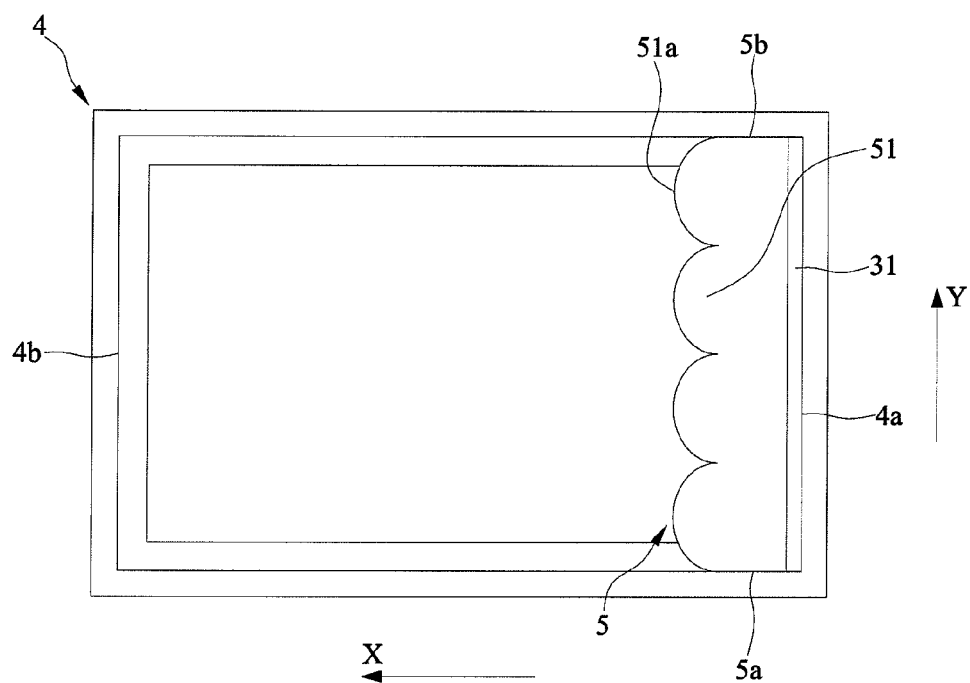
FIG. 16 is a plane view schematically illustrating a first heat radiating member according to a tenth embodiment.

FIG. 16 is a plane view schematically illustrating a first heat radiating member according to a tenth embodiment of the present invention.

In reference to FIGS. 6 to 16, the first heat radiating member 5 according to the tenth embodiment of the present invention may include a projected member 51. The projected member 51 may be projected toward the first direction (X-arrow direction). In other words, the projected member 51 is projected along a longitudinal direction of the long side 2a composing the liquid crystal panel 2 (X-arrow direction).

The projected member 51 may be curved, with a first surface 51a toward the opposite side 4b of the supporting member 4 forming a curvature. The first surface 51a of the projected member 51 may be formed with a winding curvature. Because of that, the first heat radiating member 5 may have the first surface 51a formed in an Embossing shape toward the opposite side 4b of the supporting member 4. Both portions of the first heat radiating member 5 may be symmetrical to each other with respect to a middle (5c, see FIG. 8) between both ends 5a and 5b. The first heat radiating member 5 may be smallest-sized at one end 5a and the other end 5b.

The first heat radiating member 5 according to the tenth embodiment of the present invention may be formed, with a predetermined size and weight approximately corresponding to the size of the first heat radiating member 5 according to the first embodiment. In other words, the size and weight of both ends 5a and 5b may be reduced as much as the increased size and weight of the projected member 51 and the projected member 51 is formed with a winding curvature. Because of that, the size and weight of the first heat radiating member 5 according to the tenth embodiment may be approximately corresponding to those of the first heat radiating member 5 according to the first embodiment. As a result, compared with the first embodiment, the first heat radiating member 5 according to the tenth embodiment may achieve a more excellent operational effect, even with maintaining the material cost and the like.

Eleventh Embodiment

Figure 17:
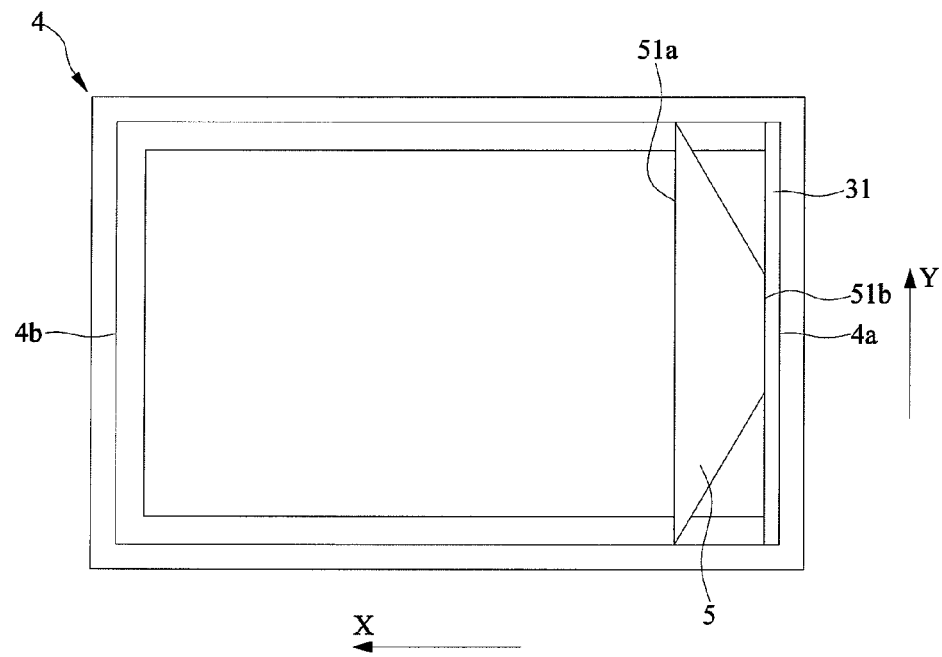
FIG. 17 is a plane view schematically illustrating a first heat radiating member according to an eleventh embodiment.
Figure 18:
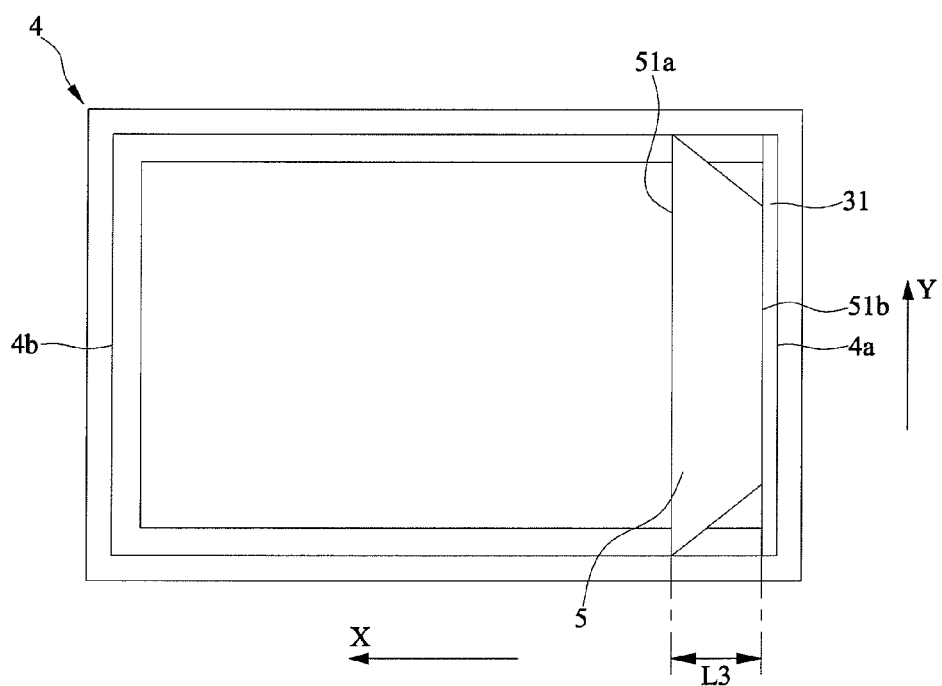
FIG. 18 is a plane view schematically illustrating a first heat radiating member according to a conversion of the eleventh embodiment.
Figure 19:
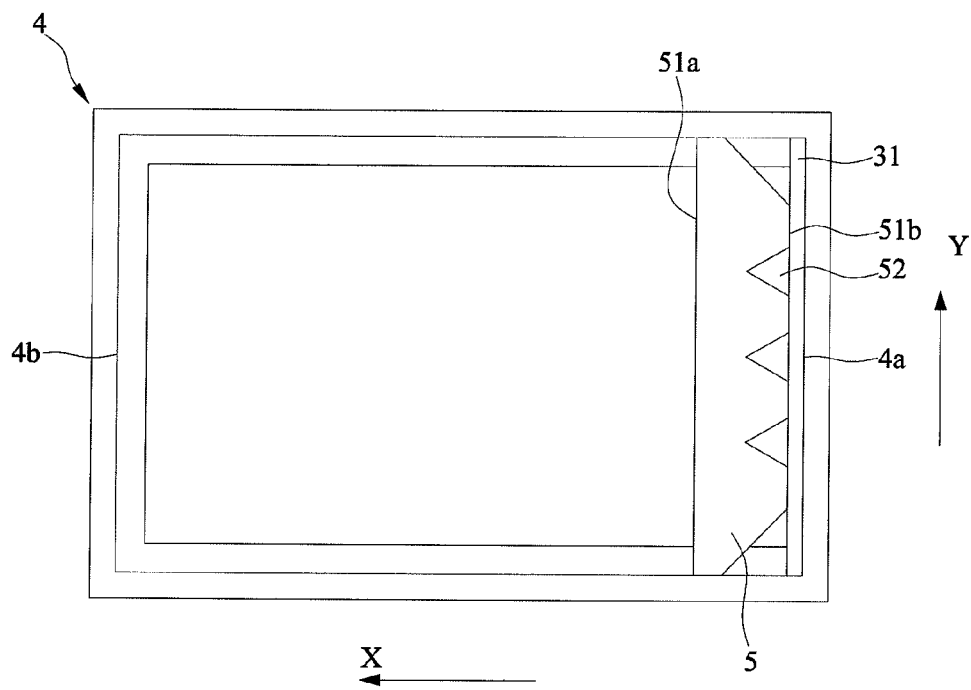
FIG. 19 is a plane view schematically illustrating a first heat radiating member according to another conversion of the eleventh embodiment.

FIG. 17 is a plane view schematically illustrating a first heat radiating member according to an eleventh embodiment. FIG. 18 is a plane view schematically illustrating a first heat radiating member according to a conversion of the eleventh embodiment. FIG. 19 is a plane view schematically illustrating a first heat radiating member according to another conversion of the eleventh embodiment.

In reference to FIGS. 6 and 17, the first heat radiating member 5 according to the eleventh embodiment of the present invention has the predetermined size gradually increased toward the first direction (X-arrow direction). In other words, the size of the first heat radiating member 5 may be increased gradually from one side 4*a* toward the opposite side 4*b* of the supporting member 4. The length of a first surface 51*a* composing the first heat radiating member 5 toward the opposite side 4*b* of the supporting member 4 may be approximately corresponding to the length (length of Y-arrow direction) of the short side 2*b* composing the liquid crystal panel 2. The length of a second surface 51*b* composing the first heat radiating member 5 toward one side 4*a* of the supporting member 4 may be shorter than the length of the short side 2*b* composing the liquid crystal panel 2 (length of Y-arrow direction). The first heat radiating member 5 may be formed in a trapezoidal shape with a predetermined size gradually increased toward the first direction (X-arrow direction). The first heat radiating member 5 according to the eleventh embodiment of the present invention may be formed, with a predetermined size and weight approximately corresponding to the size of the first heat radiating member 5 according to the first embodiment.

In reference to FIGS. 6 and 18, the length of the second surface 51*b* composing a first heat radiating member 5 according to a conversion of the eleventh embodiment toward one side 4*a* of the supporting member 4 may be shorter than the length of a short side 2*b* composing the liquid crystal panel 2 (Y-arrow direction), and it may be longer than the length of the first heat radiating member 5 according to the above eleventh embodiment. The first heat radiating member 5 according to the conversion of the eleventh embodiment may be formed, with a predetermined size and weight approximately corresponding to the size of the first heat radiating member 5 according to the eleventh embodiment. For that, the first heat radiating member 5 according to the conversion of the eleventh embodiment may be formed in a trapezoidal shape, with a predetermined length (L3) shorter than the first heat radiating member 5 according to the eleventh embodiment along the first direction (X-arrow direction).

In reference to FIGS. 6 and 19, the length of the second surface 51*b* toward one side 4*a* of the supporting member 4 provided in first heat radiating member 5 according to another conversion of the eleventh embodiment may be shorter than the length of a short side 2*b* composing the liquid crystal panel 2 (Y-arrow direction), and it may be longer than the length of the first heat radiating member 5 according to the eleventh embodiment. The first heat radiating member 5 according to another conversion of the eleventh embodiment may include at least one recess 52. The size of at least one recess 52 may be gradually decreased toward the first direction (X-arrow direction). The at least one recess 52 may be formed in a triangle shape with the predetermined size decreased toward the first direction (X-arrow direction) gradually. Although not shown, the recess 52 may be formed in a variety of shapes such as a polygonal shape including a rectangular shape as well as the triangle shape, a semi-circular shape, an oval shape and the like. Although not shown, the recess 52 may have the predetermined size increased toward the first direction (X-arrow direction) gradually. The first heat radiating member 5 may include a plurality of recesses and the recesses 52 may be spaced apart a predetermined distance from each other along a longitudinal direction of the short side 2*b* composing the liquid crystal panel 2 (Y-arrow direction). The first heat radiating member 5 according to another conversion of the eleventh embodiment may be formed, with a predetermined size and weight approximately corresponding to the size of the first heat radiating member 5 according to the eleventh embodiment.

Twelfth Embodiment

Figure 20:
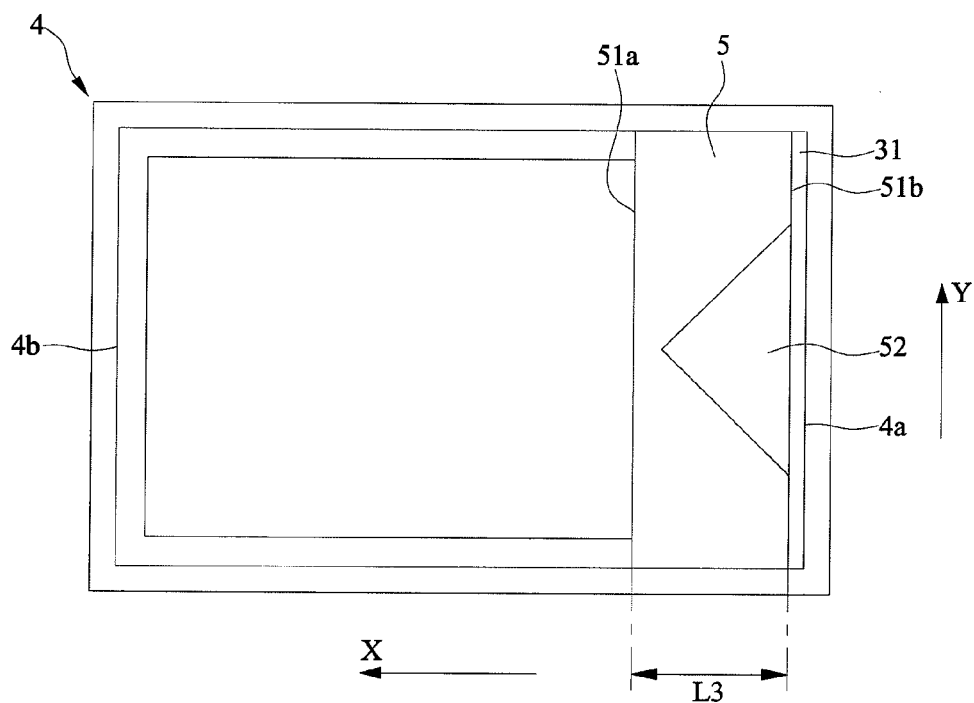
FIG. 20 is a plane view schematically illustrating a first heat radiating member according to a twelfth embodiment.
Figure 21:
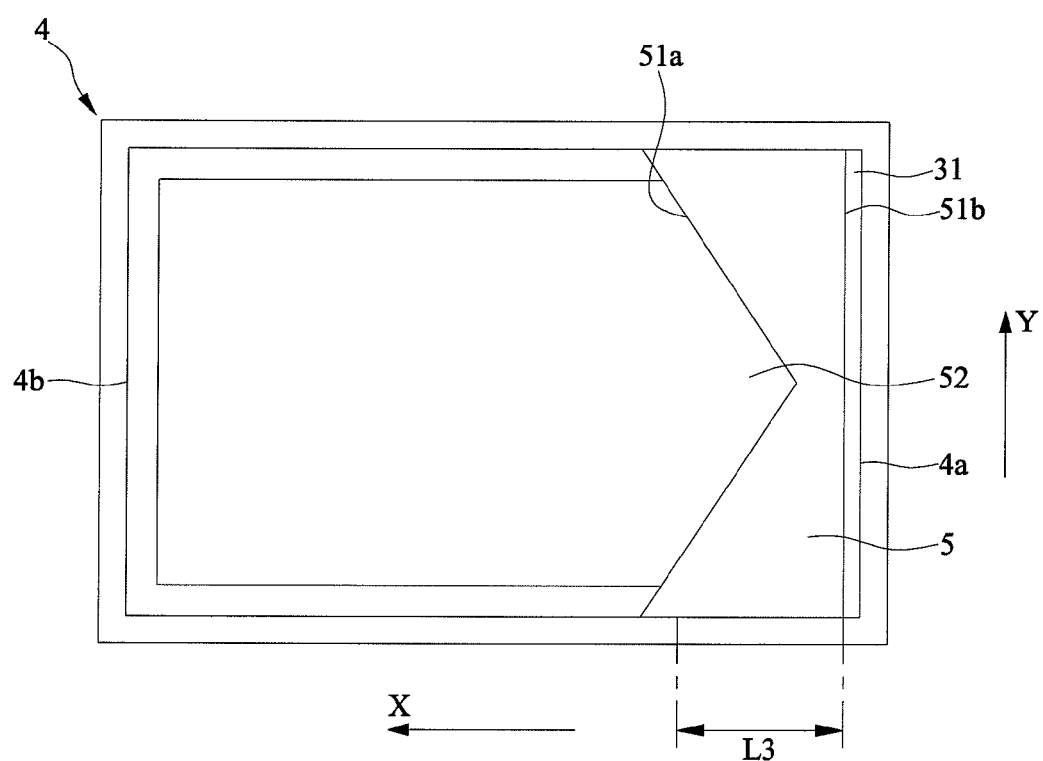
FIG. 21 is a plane view schematically illustrating a first heat radiating member according to a conversion of the twelfth embodiment.

FIG. 20 is a plane view schematically illustrating a first heat radiating member according to a twelfth embodiment. FIG. 21 is a plane view schematically illustrating a first heat radiating member according to a conversion of the twelfth embodiment.

In reference to FIGS. 6 and 20, a first heat radiating member 5 according to the twelfth embodiment of the present invention may be formed in a rectangular shape expanded along a longitudinal direction of a short side 2*b* composing the liquid crystal panel 2. The length of the first heat radiating member 5 may be approximately corresponding to the length of the short side 2*b* composing the liquid crystal panel 2 (Y-arrow direction). The first heat radiating member 5 according to the twelfth embodiment may include at least one recess 52. The recess 52 may be formed in a second surface 51*b* of the first heat radiating member 5 toward one side 4*a* of the supporting member 4. The recess 52 may have a predetermined size gradually decreased toward the first direction (X-arrow direction) and it may be formed in a triangle shape with a predetermine size gradually decreased toward the first direction (X-arrow direction). Although not shown, the recess 52 may be formed in a variety of shapes such as a polygonal shape including a rectangular shape as well as the triangle shape, a semi-circular shape, an oval shape and the like. Although not shown, the recess 52 may have the predetermined size increased toward the first direction (X-arrow direction) gradually. The first heat radiating member 5 may include a plurality of recesses and the recesses 52 may be spaced apart a predetermined distance from each other along a longitudinal direction of the short side 2*b* composing the liquid crystal panel 2 (Y-arrow direction). The first heat radiating member 5 according to the twelfth embodiment may be formed, with a predetermined size and weight approximately corresponding to the size of the first heat radiating member 5 according to the first embodiment. Because of that, the first heat radiating member according to the twelfth embodiment of the present invention may have a predetermined length (L3) longer than the first heat radiating member according to the first embodiment along the first direction (X-direction).

In reference to FIGS. 6 and 21, a first heat radiating member 5 according to conversion of the twelfth embodiment may include a recess 52 formed in a first surface 51*a* of the first heat radiating member 5 toward the opposite side 4*b* of the supporting member 4. The recess 52 may be formed in a triangle shape with a predetermined size gradually decreased toward the one side 4*a* from the opposite side 4*b* of the supporting member 4. Although not shown, the recess 52 may be formed in a variety of shapes such as a polygonal shape including a rectangular shape as well as the triangle shape, a semi-circular shape, an oval shape and the like. Although not shown, the recess 52 may have the predetermined size increased toward the one side 4*a* from the opposite side 4*b* of the supporting member 4 gradually. Although not shown, the first heat radiating member 5 may include a plurality of recesses. In this case, the recesses 52 may be spaced apart a predetermined distance from each other along a longitudinal direction of the short side 2*b* composing the liquid crystal panel 2 (Y-arrow direction). The first heat radiating member 5 according to the conversion of the twelfth embodiment may be formed, with a predetermined size and weight approximately corresponding to the size of the first heat radiating member 5 according to the first embodiment. Because of that, the first heat radiating member 5 according to conversion of the twelfth embodiment of the present invention may have a predetermined length (L3) longer than the first heat radiating member according to the first embodiment along the first direction (X-direction).

As follows, the combining structure of the liquid crystal display device will be described in reference to the accompanying drawings.

Figure 22:
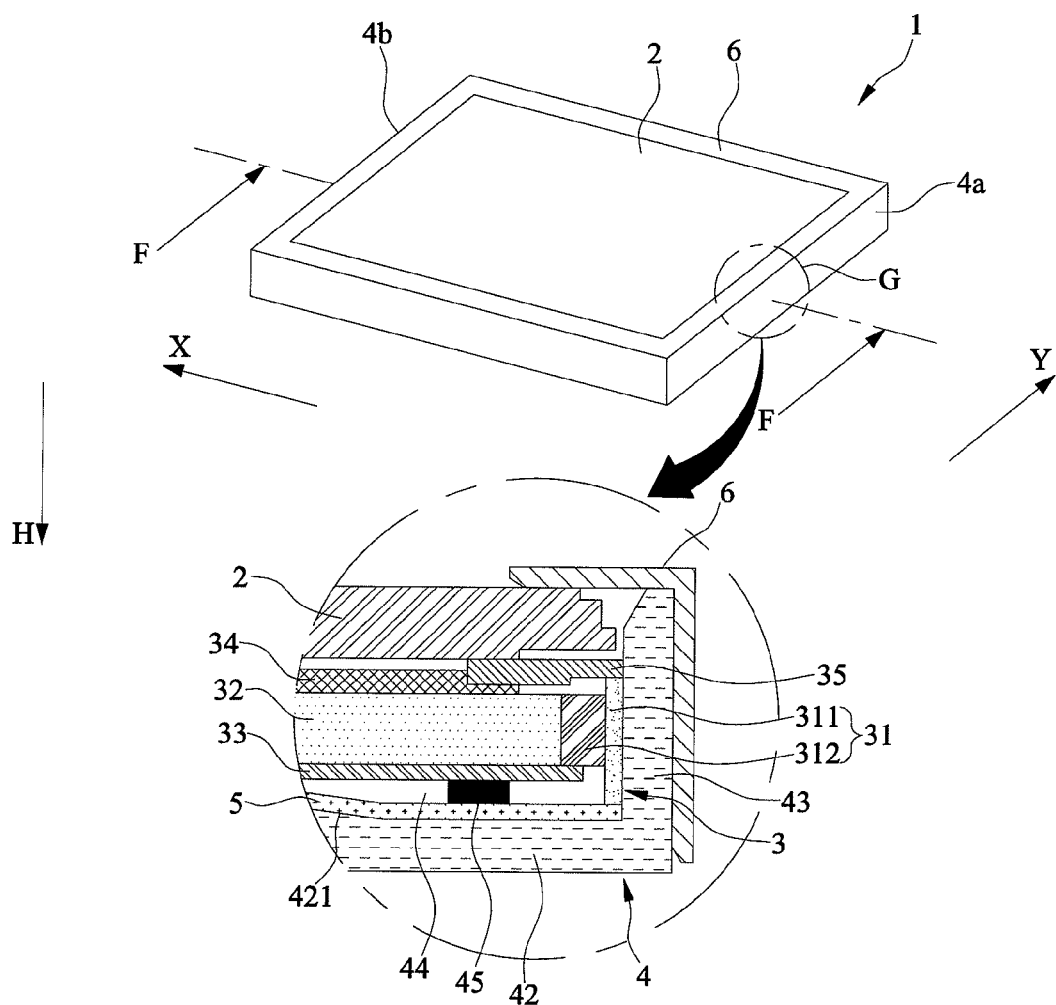
FIG. 22 is a perspective view schematically illustrating a combining structure of the liquid crystal display device and a sectional view illustrating 'G' portion with respect to F-F line.
Figure 23:
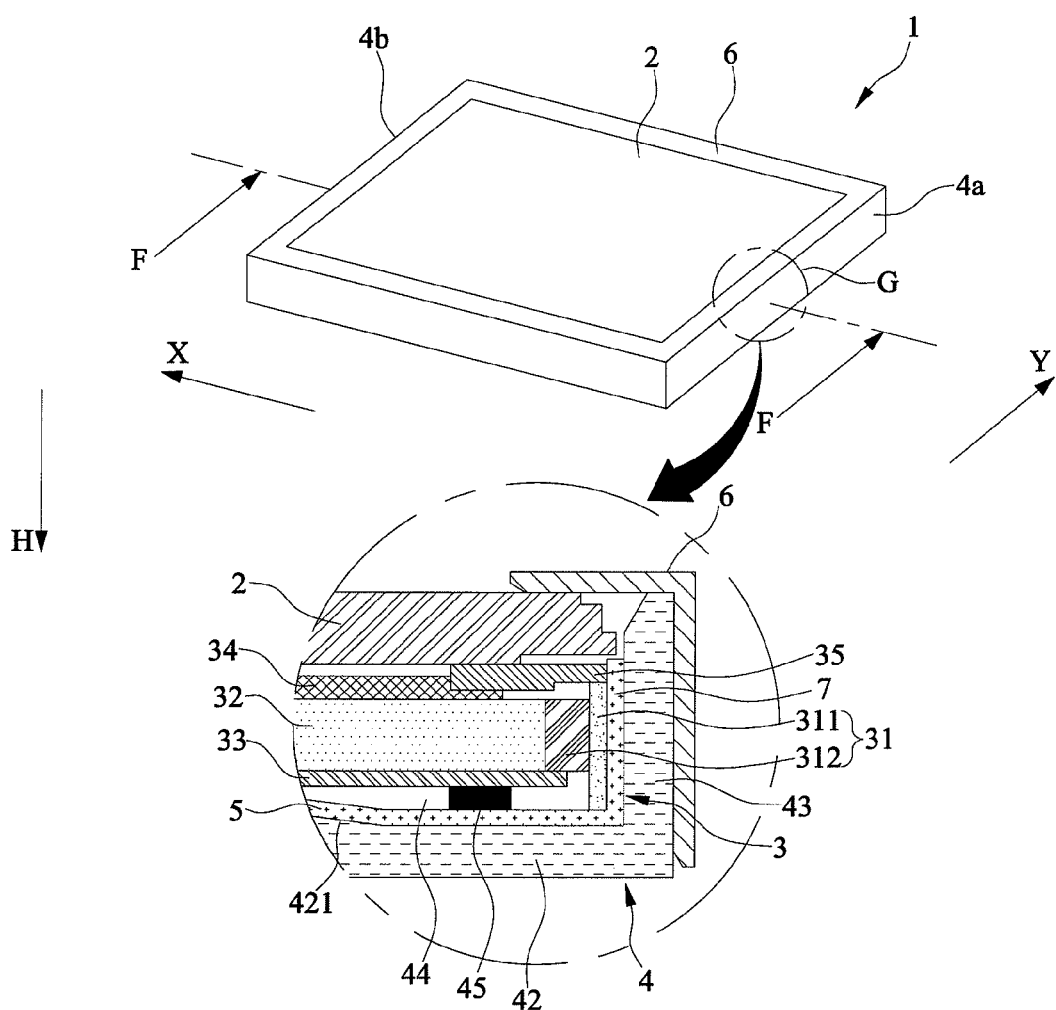
FIG. 23 is a perspective view schematically illustrating a combining structure of a liquid crystal display device a perspective view schematically illustrating a combining structure of the liquid crystal display device and a sectional view illustrating 'G' portion with respect to F-F line.
Figure 24:
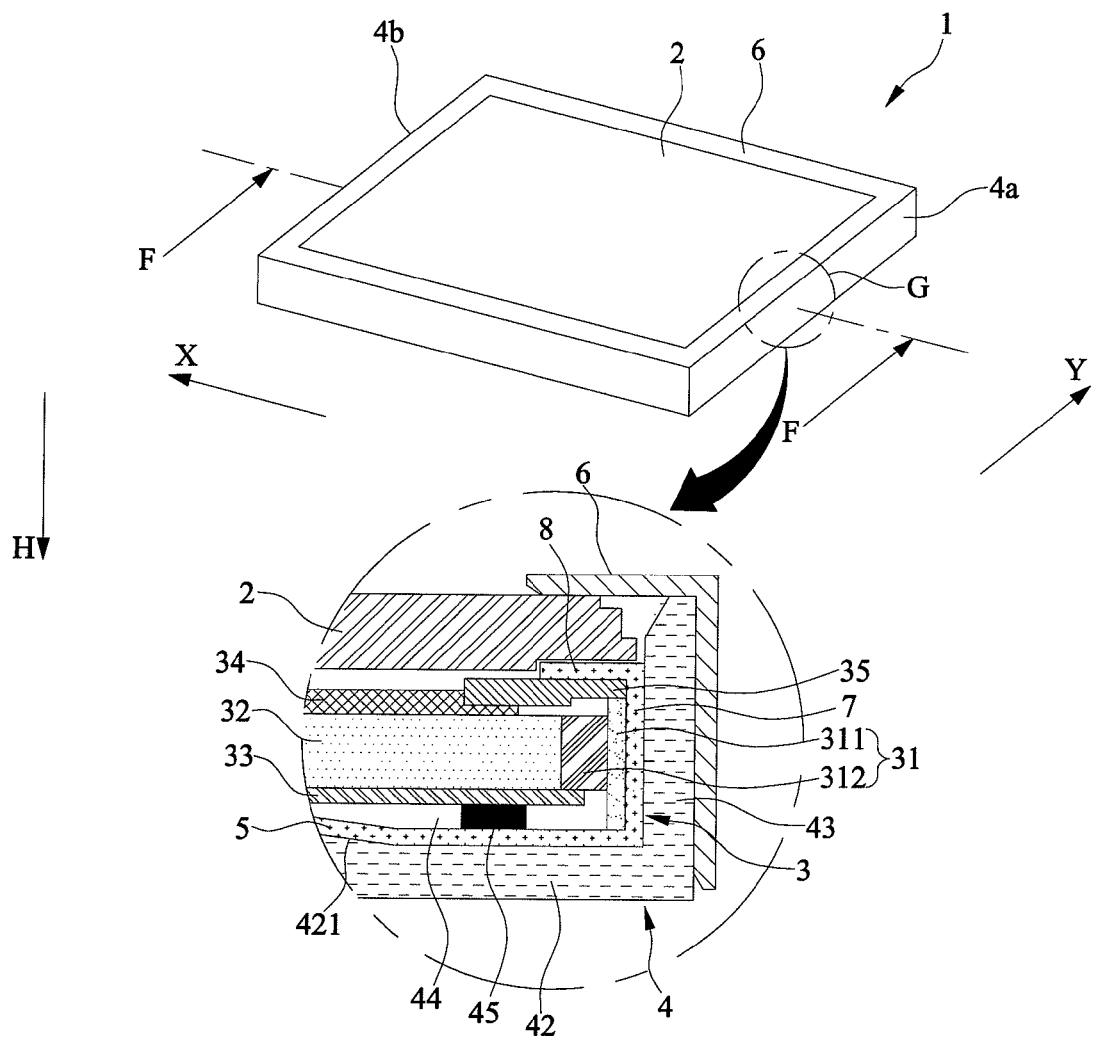
FIG. 24 is a perspective view schematically illustrating a combining structure of a liquid crystal display device according to another converted embodiment of the present invention and a sectional view illustrating portion with respect to F-F line.

FIG. 22 is a perspective view schematically illustrating a combining structure of the liquid crystal display device and a sectional view illustrating 'G' portion with respect to F-F line. FIG. 23 is a perspective view schematically illustrating a combining structure of a liquid crystal display device a perspective view schematically illustrating a combining structure of the liquid crystal display device and a sectional view illustrating 'G' portion with respect to F-F line. FIG. 24 is a perspective view schematically illustrating a combining structure of a liquid crystal display device according to another converted embodiment of the present invention and a sectional view illustrating 'G' portion with respect to F-F line.

In reference to FIG. 22, the liquid crystal panel 2, the backlight unit 3 and the first heat radiating member 5 provided in the liquid crystal display device 1 according to the present invention may be installed within the supporting member 4. Here, the first heat radiating member 5 is embodied as one of the first to twelfth embodiments. With respect to FIG. 22, the backlight unit 3 may be located below the liquid crystal panel 2 and the first heat radiating member 5 may be located below the backlight unit 3, in a vertical direction (H-arrow direction).

In reference to FIG. 22, the backlight unit 3 has the light guide plate 32 located below the optical sheet and the relative plate 33 below the light guide plate 32. Here, the first heat radiating member 5 may be located below the reflective plate 33. The backlight unit 3 may include the light source part 31 located beside the light guide plate 32. Also, the backlight unit 3 may further include a light source part housing 35 located between the light source part 31 and the liquid crystal panel 2. The light source part housing 35 may be supported by the optical sheet 34 and the light source part 31.

In reference to FIG. 22, the supporting member 4 may include a side wall 43 extended upwardly (opposite to H-arrow direction) from an outer surface of the supporting plate 42. The supporting member 4 may be formed in a square shape and it may include four side walls 43.

The supporting member 4 may include an installation recess 44. The installation recess 44 may be formed in one of the supporting plates 42 located in one side 4a of the supporting member 4 having the light source part 31 mounted thereto. The installation recess 44 allows the light source part 31 to be installed next to the light guide plate 32. The light sources 311 may be installed in a center portion of the substrate 312 in the vertical direction (H-arrow direction). Because of that, a predetermined portion of the substrate 312 may be projected downwardly with respect to the light sources 311 and the light sources 311 fail to be installed beside the light guide plate 32, without the installation recess 44. If then, some of the lights emitted from the light sources 311 fail to be incident on the light guide plate 32. To solve the problem, the size of the light guide plate 32 has to increase and the material cost happens to increase disadvantageously. According to the liquid crystal display device 1 of the present invention, the installation recess 44 enables the light sources 311 to be installed next to the light guide plate 32. Because of that, all of the lights emitted from the light sources 311 can be incident on the light guide plate 32. In addition, the size of the light guide plate 32 does not have to increase according to the liquid crystal display device 1 of the present invention. AS a result, the material cost may be prevented from increasing.

Here, the backlight unit 3 may be supported by the supporting member 4 and it may be spaced apart a predetermined distance from the supporting member 4 in a predetermined portion of the supporting member 4 having the installation recess 44 formed therein. Because of that, a predetermined portion of the backlight unit 3 may be bent because of its weight. To prevent the bent portion, the supporting member 4 may include a holding member 45 located in the installation recess 44. The holding member 45 may be provided between the backlight unit 3 and the first heat radiating member 5 and it may support the backlight unit 3, to prevent the backlight unit 3 from bent because of the self weight of the backlight unit 3. The holding member 45 may be located between the reflective plate 33 and the first heat radiating member 5 and it may hold the portion of the installation recess 44 from the reflective plate 33.

In reference to FIG. 22, the first heat radiating member 5 may be installed in one of the supporting members 42 located in one side 4a having the light source part 31 mounted thereto. With respect to FIG. 22, the first heat radiating member 5 may be installed below the reflective plate 33 and the light source part 31 in a vertical direction (H-arrow direction). The substrate 312 of the light source part 31 may be installed to be able to contact with the first heat radiating member 5 or to be spaced part a predetermined distance from the first heat radiating member 5. The supporting plate 42 may include an oblique surface 421 formed in a predetermined portion having the installation recess 44 formed therein obliquely along the first direction (X-arrow direction). The first heat radiating member 5 may be in parallel to the portion having the installation recess 44 formed therein and it may be curved at the portion having the oblique surface 421 formed therein along the oblique surface 421.

The liquid crystal display device 1 according to the present invention may include a case 6. The case 6 may be coupled to the supporting member 4 and it may cover a predetermined upper portion of an upper surface of the liquid crystal panel 2 and the side wall 43 of the supporting member 4. The case 6 may include a through-hole configured to allow an image displayed on the liquid crystal panel 2 to be visible there through from outside.

In reference to FIG. 23, a liquid crystal display device 1 according to a conversion of the present invention may include a second heat radiating member 7 configured to radiate heat generated from the light source part 31. The second heat radiating member 7 may be installed between the light source part 31 and the side wall 43 of the supporting member 4. With respect to FIG. 23, the second heat radiating member 7 may be located beside the light source part 31. The light source part 31 may be connected to the second heat radiating member 7. The second heat radiating member 7 may be formed of Aluminum (Al) having good heat conductivity and it may be formed in a square plate shape. The length of the second heat radiating member 7 be approximately corresponding to the length of the short side (2b, see FIG. 6) composing the liquid crystal panel 2 (the length of Y-arrow direction).

The second heat radiating member 7 may be installed in opposite to the liquid crystal panel 2 with respect to the light source part 31. Because of that, the second heat radiating member 7 may radiate the heat generated from the light source part 31 farther from the liquid crystal panel 2 and the heat generated from the light source part 31 may be prevented from being transmitted to the liquid crystal panel 2. As a result, the liquid crystal display device 1 according to the converted embodiment of the present invention may be reduce the temperature difference between the portion of the liquid crystal panel 2 close to the light source part 31 and the portion distant from the light source part 31, which is generated by the heat of the light source part 31.

The second heat radiating member 7 may be connected with the first heat radiating member 5. Because of that, some of the heat generated from the light source part 31 is transmitted to the second heat radiating member 7 and then to the first heat radiating member 5. After that, the heat may be transmitted along the first direction (X-arrow direction) by the first heat radiating member 5. As a result, the liquid crystal display device 1 according to the conversion of the present invention may enable the temperature variation from the portion of the liquid crystal panel 2 close to the light source part 31 to the portion distant from the light source part 31 to be eased gently. As a result, the liquid crystal display device 1 according to the conversion of the present invention may enable the transmittance variation generated by the heat of the light source part 31 to occur gently and gradually. Because of that, even though it is partially generated in the liquid crystal panel 2, the transmittance difference may be eased. Here, the second heat radiating member 7 may be integrally formed with the first heat radiating member 5.

In reference to FIG. 24, a liquid crystal display device 1 according to another converted embodiment of the present invention may further include a third heat radiating member 8 configured to radiate heat generated from the light source part 31. The third heat radiating member 8 may be installed between the light source part 31 and the liquid crystal panel 2. With respect to FIG. 24, the third heat radiating member 8 may be located beyond the light source part 31. When the backlight unit 3 includes the light source part housing 35, the third heat radiating member 8 may be located beyond the light source part housing 35. The third heat radiating member 8 may be formed of Aluminum (Al) having good heat conductivity and it may be formed in a square plate shape. The length of the third heat radiating member 8 may be approximately corresponding to the length of the short side (2b, see FIG. 6) composing the liquid crystal panel 2 (the length along Y-arrow direction).

The third heat radiating member 8 may be connected to the second heat radiating member 7 and the second heat radiating member 7 may be connected to the first heat radiating member 5. Because of that, some of the heat generated from the light source part 31 may be transmitted from the third heat radiating member 8 to the second heat radiating member 7 and the first heat radiating member 5 sequentially. After that, some of the heat may be transmitted along the first direction (X-arrow direction) by the first heat radiating member 5. As a result, the liquid crystal display device 1 according to another converted embodiment of the present invention may reduce the temperature variation from the portion of the liquid crystal panel 2 close to the light source part 31 to the portion distant from the light source part 3. As a result, the liquid crystal display device 1 according to the conversion of the present invention may enable the transmittance variation generated by the heat of the light source part 31 to occur gently and gradually. Because of that, even though it is partially generated in the liquid crystal panel 2, the transmittance difference may be eased.

The third heat radiating member 8, the second heat radiating member 7 and the first heat radiating member 5 may be integrally formed with each other. The third heat radiating member 8 and the third heat radiating member 5 may be spaced apart from each other as far as the length of the second heat radiating member 7 along the vertical direction (H-arrow direction). The third heat radiating member 8 may be in parallel to the first heat radiating member 5 along the first direction (X-arrow direction) and the third heat radiating member 8 may be extended more shortly along the first direction (X-arrow direction) than the first heat radiating member 5. The light source part 31 may be inserted between the third heat radiating member 8 and the first heat radiating member 5. Because of that, the first heat radiating member 5, the second heat radiating member 7, the third heat radiating member 8 and the light source part 31 may be securely fixed without separated from the installation locations thereof, even if a predetermined external force such as vibration and shock is applied to the liquid crystal display device 1. In other words, the liquid crystal display device 1 according to this converted embodiment of the present invention may have an improved structural stability. With respect to FIG. 24, the length of the light source part 31 may be approximately corresponding to the length of the second heat radiating member 7 along the vertical direction (H-arrow direction). As a result, the light source part 31 may be inserted between the third heat radiating member 8 and the first heat radiating member 5 and it may be stably fixed by the third heat radiating member 8 and the first heat radiating member 5. If the backlight unit 3 includes the light source part housing 35, the light source part 31 and the light source part housing 35 may be inserted between the third heat radiating member 8 and the third heat radiating member 5.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   a liquid crystal panel having a liquid crystal layer formed between a first substrate and a second substrate;
   a backlight unit comprising a light source part located adjacent to a short side of the liquid crystal panel and a light guide plate configured to transmit light emitted from the light source part to the liquid crystal panel;
   a supporting member configured to support the backlight unit; and
   a first heat radiating member radiating heat generated from the light source part, wherein the first heat radiating member is provided at one side of the supporting member, and is positioned between the light source part and the supporting member, and
   wherein the first heat radiating member is gradually decreased in size from one side of the supporting member toward the opposite side of the supporting member and is formed in Gaussian distribution shape, with a middle between its both ends being projected along a predetermined direction from one side of the supporting member and the opposite side of the supporting member.

2. The liquid crystal display device of claim 1, wherein the light source part comprises a light source configured to emit light, and a substrate having the light source installed thereon; and
   the supporting member comprises a supporting plate configured to support the substrate of the light source part, and an installation recess is formed in the supporting plate, wherein the installation recess allows the light source to be installed next to the light guide plate.

3. The liquid crystal display device of claim 2, wherein the supporting member comprises a holding member located in the installation recess, and
   wherein the holding member supports the backlight unit.

4. The liquid crystal display device of claim 1, further comprising:
a second heat radiating member configured to radiate heat generated from the light source, wherein the second heat radiating member is located in opposite to the liquid crystal panel with respect to the light source part.

5. The liquid crystal display device of claim 4, further comprising a third heat radiating member configured to radiate heat generated from the light source, wherein the third heat radiating member is located between the light source part and the liquid crystal panel, and
wherein the second heat radiating member is connected to the first heat radiating member and the third heat radiating member, respectively.

6. The liquid crystal display device of claim 5, wherein the first heat radiating member, the second heat radiating member and the third heat radiating member are integrally formed with each other.

7. The liquid crystal display device of claim 5, wherein the light source part is insertedly installed between the third heat radiating member and the first heat radiating member.

8. A liquid crystal display device comprising:
a liquid crystal panel having a liquid crystal layer formed between a first substrate and a second substrate;
a backlight unit comprising a light source part located adjacent to a short side of the liquid crystal panel and a light guide plate configured to transmit light emitted from the light source part to the liquid crystal panel;
a supporting member configured to support the backlight unit; and
a first heat radiating member radiating heat generated from the light source part, wherein the first heat radiating member is provided at one side of the supporting member, and is positioned between the light source part and the supporting member,
wherein the first heat radiating member comprises a plurality of projected members projected along a predetermined direction from one side of the supporting member toward the opposite side of the supporting member, and
wherein the projected members are formed between both ends of the first heat radiating member and are gradually decreased in size from one side of the supporting member toward the opposite side of the supporting member.

9. A liquid crystal display device comprising:
a liquid crystal panel having a liquid crystal layer formed between a first substrate and a second substrate;
a backlight unit comprising a light source part located adjacent to a short side of the liquid crystal panel and a light guide plate configured to transmit light emitted from the light source part to the liquid crystal panel;
a supporting member configured to support the backlight unit; and
a first heat radiating member radiating heat generated from the light source part, wherein the first heat radiating member is provided at one side of the supporting member, and is positioned between the light source part and the supporting member,
wherein the first heat radiating member comprises a projected member projected along a predetermined direction from one side of the supporting member toward the opposite side of the supporting member, and
wherein the projected member comprises a first surface formed with a curvature toward the opposite side of the supporting member.

\* \* \* \* \*